United States Patent
Stevenson et al.

(10) Patent No.: US 9,637,696 B2
(45) Date of Patent: May 2, 2017

(54) SOLIDS SUPPLY SYSTEM AND METHOD FOR SUPPLYING SOLIDS

(71) Applicant: General Electric Company, Schenectady, NY (US)

(72) Inventors: John Saunders Stevenson, Yorba Linda, CA (US); Judith Pauline Oppenheim, Friendswood, TX (US); Anthony Holmes Furman, Scotia, NY (US); Thomas Frederick Leininger, Chino Hills, CA (US); Steven Craig Russell, Houston, TX (US); Michael Kent Cueman, Yorktown, VA (US)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 13/834,004

(22) Filed: Mar. 15, 2013

(65) Prior Publication Data
US 2014/0270993 A1    Sep. 18, 2014

(51) Int. Cl.
*B65G 53/16*    (2006.01)
*C10J 3/72*    (2006.01)
*F02C 3/28*    (2006.01)

(52) U.S. Cl.
CPC ........... *C10J 3/723* (2013.01); *F02C 3/28* (2013.01); *C10J 2200/156* (2013.01); *C10J 2300/0933* (2013.01); *C10J 2300/0936* (2013.01); *C10J 2300/165* (2013.01); *C10J 2300/1606* (2013.01); *C10J 2300/1653* (2013.01); *C10J 2300/1675* (2013.01); *C10J 2300/1876* (2013.01); *C10J 2300/1892* (2013.01); *Y02E 20/18* (2013.01)

(58) Field of Classification Search
CPC ..................................... B65G 53/16
USPC ............... 406/14, 30, 71, 146; 110/105
See application file for complete search history.

(56) References Cited

U.S. PATENT DOCUMENTS 4,362,441 A * 12/1982 Meyer et al. ............ 406/14
4,420,279 A * 12/1983 Easley, Jr. ............... 406/14
(Continued)

FOREIGN PATENT DOCUMENTS

EP    0308026 A2    3/1989
EP    1749567 B1    4/2008

OTHER PUBLICATIONS

Aldred, Derek L., Proof of Principal Test to Feed and Meter Granular Coal into 450 psig Gas Pressure, Final Report, Stamet Inc., Gardena, California, Issued Jul. 2000.
(Continued)

*Primary Examiner* — Joseph Dillon, Jr.
(74) *Attorney, Agent, or Firm* — Armstrong Teasdale LLP

(57) ABSTRACT

A pressure control system is provided. The pressure control system includes a first pressure sensing device configured to obtain a first pressure measurement including at least one of a first differential pressure and a first pressure, the first pressure measurement obtained from at least one of within and downstream from a solids supply system, a second pressure sensing device configured to obtain a second pressure measurement including at least one of a second differential pressure and a second pressure within the solids supply system, and a pressure controller configured to use the first pressure measurement and the second pressure measurement to control a pressure within the solids supply system.

8 Claims, 5 Drawing Sheets

(56) References Cited

U.S. PATENT DOCUMENTS

| | | | |
|---|---|---|---|
| 4,490,077 A * | 12/1984 | Shimada et al. | 406/14 |
| 4,529,336 A * | 7/1985 | Shinozaki et al. | 406/14 |
| 4,662,799 A * | 5/1987 | Paul et al. | 406/14 |
| 4,669,921 A * | 6/1987 | Flament et al. | 406/14 |
| 4,758,117 A * | 7/1988 | Maki et al. | 406/14 |
| 4,830,545 A * | 5/1989 | Salter et al. | 406/12 |
| 4,917,544 A * | 4/1990 | Crahan et al. | 406/14 |
| 6,287,056 B1 * | 9/2001 | Szikszay | 406/197 |
| 6,386,800 B1 * | 5/2002 | van Eyck | 406/95 |
| 8,113,745 B2 * | 2/2012 | Aoki | 406/197 |
| 8,337,122 B2 * | 12/2012 | Schultz | 406/146 |
| 8,496,412 B2 * | 7/2013 | Livingood et al. | 406/73 |
| 8,651,772 B2 * | 2/2014 | Kim et al. | 406/63 |
| 8,951,314 B2 * | 2/2015 | Leininger et al. | 48/62 R |
| 2008/0145156 A1 | 6/2008 | Livingood et al. | |
| 2009/0107046 A1 | 4/2009 | Leininger et al. | |
| 2011/0036120 A1 * | 2/2011 | Jager | C10L 3/10 62/611 |
| 2014/0150288 A1 * | 6/2014 | Leininger et al. | 34/500 |
| 2014/0150873 A1 * | 6/2014 | Stevenson et al. | 137/1 |
| 2014/0151191 A1 * | 6/2014 | Stevenson et al. | 198/572 |
| 2014/0244051 A1 * | 8/2014 | Rollins | G05D 27/02 700/282 |
| 2015/0107536 A1 * | 4/2015 | Janvier | F01K 13/02 122/406.1 |

OTHER PUBLICATIONS

Aldred, Derek L. et al., Achieve Continuous Injection of Solid Fuels into Advanced Combustion System Pressures, Final Report—Phase ll Program, Stamet Inc., Gardena California, Issued Jul. 2005.
Rotofeed, Clyde Bergmann Power Group, available at http://www.cbpg.com/content_manager/go/ID/262090/dbc/, last visited Mar. 12, 2013.
Rotofeed Data Sheet 1098e, Clyde Materials Handling, South Yorkshire, England, UK Issue: Mar. 2001.
Thorn, Jonathan, M.S., Guide to Handling Airlock Leakage in Pneumatic Conveying Systems, MAC Equipment, Inc., Kansas City, MO, available at http://www.macprocessinc.com/pdf/Airlock%20Leakage%02oOct%2008.pdf, last visited Mar. 12, 2013.

* cited by examiner

SOLIDS SUPPLY SYSTEM AND METHOD FOR SUPPLYING SOLIDS

BACKGROUND OF THE INVENTION

This invention relates generally to gasification systems, and more specifically, to a solids supply system having a pressure control system, the solids supply system for supplying solid fuel in a gasification system.

At least one known gasification system, such as an integrated gasification combined-cycle (IGCC) plant, includes a fuel supply system that is coupled upstream of a gasifier and that is configured to channel fuel to the gasifier. At least one known fuel is a slurry of powder coal and water. In such a system, the slurry is a viscous liquid that is metered within the fuel supply system and that is delivered at a predetermined pressure to the gasifier. Water is used to facilitate transport of the slurry through the fuel supply system. Accordingly, in such systems, the significant amounts of water used to transport the viscous liquid may impose a thermodynamic penalty on the fuel supply system, the gasifier, or other systems within the IGCC plant. Depending on the system, the penalty imposed may adversely affect the efficiency and capital cost of the IGCC plant.

At least one other known fuel supply system channels a dry fuel, such as coal, to the gasifier. The dry fuel is channeled through a lockhopper that pressurizes the dry coal. Once the lockhopper has pressurized the coal, the coal is then transported through the fuel supply system to the gasifier wherein the fuel is injected into the gasifier. However, instabilities in the control of the flow and pressure of the fuel feed may make it difficult to supply the fuel in a consistent manner. This may result in higher operating and capital costs due to a negative effect on efficiency, increased down time, and the need to use more expensive components.

At least one known feed hopper controls differential pressure between a feed vessel and a reactor using a controller. However, such a control addresses system pressure drop without controlling pressure drops across components of the system. Another known pressure control system controls a feed rate of solids and addresses the system pressure drop without controlling pressure drops across components of the system. Further, the pressure control system requires that a vent line and pressurizing lines be connected to the same header.

BRIEF DESCRIPTION OF THE INVENTION

In one aspect, a pressure control system is provided. The pressure control system includes a first pressure sensing device configured to obtain a first pressure measurement including at least one of a first differential pressure and a first pressure, the first pressure measurement obtained from at least one of within and downstream from a solids supply system, a second pressure sensing device configured to obtain a second pressure measurement including at least one of a second differential pressure and a second pressure within the solids supply system, and a pressure controller configured to use the first pressure measurement and the second pressure measurement to control a pressure within the solids supply system.

In another aspect, a solids supply system is provided. The solids supply system includes a pressurizing device configured to pressurize feed stock from a first pressure to a second pressure higher than the first pressure, a high pressure feed bin coupled in flow communication with the pressurizing device, the high pressure feed bin configured to receive the pressurized feed stock from the pressurizing device, a metering device coupled in flow communication with the high pressure feed bin, the metering device configured to meter the pressurized feed stock into a downstream component, and a pressure control system coupled in communication with the pressurizing device, the high pressure feed bin, and the metering device. The pressure control system includes a first pressure sensing device configured to obtain a first pressure measurement including at least one of a first differential pressure and a first pressure, the first pressure measurement obtained from at least one of within and downstream from the solids supply system, a second pressure sensing device configured to obtain a second pressure measurement including at least one of a second differential pressure and a second pressure within the solids supply system, and a pressure controller configured to use the first pressure measurement and the second pressure measurement to control a pressure within the high pressure feed bin.

In another aspect, a method for supplying solids from a low pressure source to a high pressure receptacle using a solids supply system is provided. The method includes obtaining a first pressure measurement using a first pressure sensing device within the solids supply system, the first pressure measurement including at least one of a first differential pressure and a first pressure, the first pressure measurement obtained from at least one of within and downstream from the solids supply system, obtaining a second pressure measurement using a second pressure sensing device within the solids supply system, the second pressure measurement including at least one of a second differential pressure and a second pressure within the solids supply system, and controlling a pressure within the solids supply system based on the first pressure measurement and the second pressure measurement using a pressure controller.

In yet another aspect, a method for controlling a pressure within a feeder of a solids supply system is provided. The method includes obtaining a first pressure measurement using a first pressure sensing device, the first pressure measurement including at least one of a first differential pressure and a first pressure, the first pressure measurement obtained from at least one of within and downstream from the feeder, obtaining a second pressure measurement using a second pressure sensing device, the second pressure measurement including at least one of a second differential pressure and a second pressure from at least one of within and upstream from the feeder, and controlling the pressure within the feeder based on the first pressure measurement and the second pressure measurement by selectively pressurizing or depressurizing the metering device using at least one of a flow of gas supplied to the feeder and a flow of gas discharged from the feeder.

DETAILED DESCRIPTION OF THE INVENTION

The embodiments described herein provide a pressure control system for use with a solids supply system. More specifically, the pressure control system uses a plurality of pressure and differential pressure measurements throughout the solids supply system to increase the fuel feed stock from a relatively low pressure to a relatively high pressure to feed the fuel into another component at the high pressure. Further, the pressure control system described herein facilitates preventing process gases from flowing into low pressure components located at an upstream portion of the solids supply system. The pressure control system is described herein as being used to feed fuel into a gasifier; however, it should be understood that the pressure control system can be used within any component requiring a high pressure feed of solid material, such as a blast furnace.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
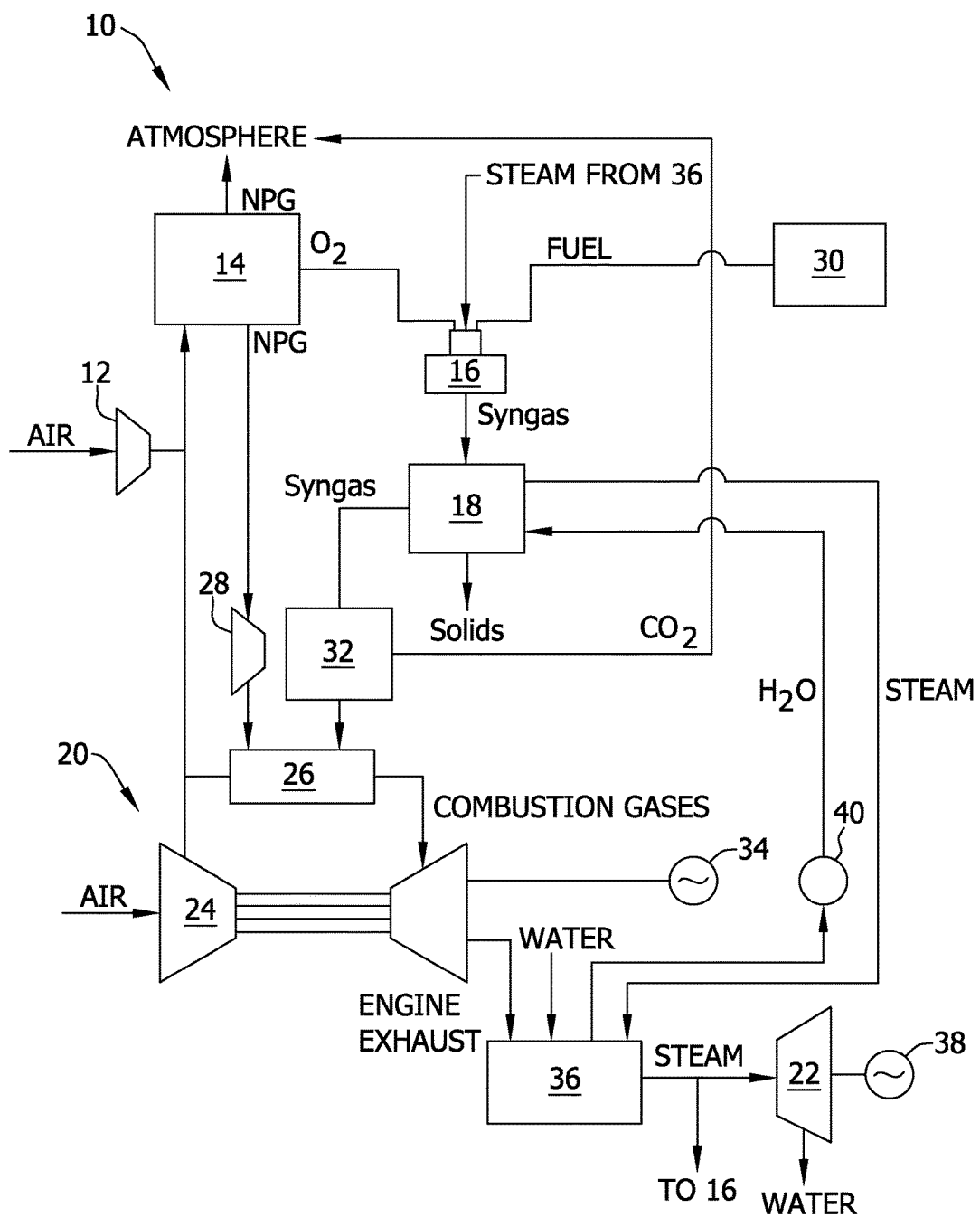
FIG. 1 is a schematic view of an exemplary integrated gasification combined cycle (IGCC) system.

FIG. 1 is a schematic diagram of an exemplary integrated gasification combined-cycle (IGCC) power generation system 10. IGCC system 10 generally includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication to syngas cooler 18, and a steam turbine 22 coupled in flow communication to syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas". The $O_2$ flow is channeled to gasifier 16 for use in generating partially combusted gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at least some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a compressor 28 for compressing the nitrogen process gas flow before being injected into the combustion zone of gas turbine engine combustor 26.

In the exemplary embodiment, gasifier 16 converts a fuel and/or a mixture of fuel supplied from a solids supply system 30, $O_2$ supplied by ASU 14, steam, and limestone into an output of syngas for use by gas turbine engine 20 as fuel. Although gasifier 16 may use any fuel, gasifier 16, in the exemplary embodiment, uses coal, petroleum coke, and/or other similar fuels. Furthermore, in the exemplary embodiment, the syngas generated by gasifier 16 includes carbon dioxide ($CO_2$). Gasifier 16 may be a fixed-bed gasifier, a fluidized-bed gasifier, and/or a fully entrained flow gasifier.

In the exemplary embodiment, syngas generated by gasifier 16 is channeled to syngas cooler 18 to facilitate cooling the syngas, as described in more detail below. The cooled syngas is channeled from cooler 18 to a clean-up device 32 for cleaning the syngas before it is channeled to gas turbine engine combustor 26 for combustion thereof. $CO_2$ may be separated from the syngas during clean-up and, in the exemplary embodiment, may be vented to the atmosphere. In an alternative embodiment, the $CO_2$ may be used within IGCC 10 as a moderator and/or as a carrier for solid feeds used in gasifier 18. Gas turbine engine 20 drives a generator 34 that supplies electrical power to a power grid (not shown). Exhaust gases from gas turbine engine 20 are channeled to a heat recovery steam generator 36 that generates steam for driving steam turbine 22. Power generated by steam turbine 22 drives an electrical generator 38 that provides electrical power to the power grid. In the exemplary embodiment, steam from heat recovery steam generator 36 may be supplied to gasifier 16 for generating syngas.

Furthermore, in the exemplary embodiment, IGCC system 10 includes a pump 40 that supplies boiled water from steam generator 36 to syngas cooler 18 to facilitate cooling the syngas channeled from gasifier 16. The boiled water is channeled through syngas cooler 18 wherein the water is converted to steam. The steam from cooler 18 is then returned to steam generator 36 for use within gasifier 16, syngas cooler 18, and/or steam turbine 22.

Figure 2:
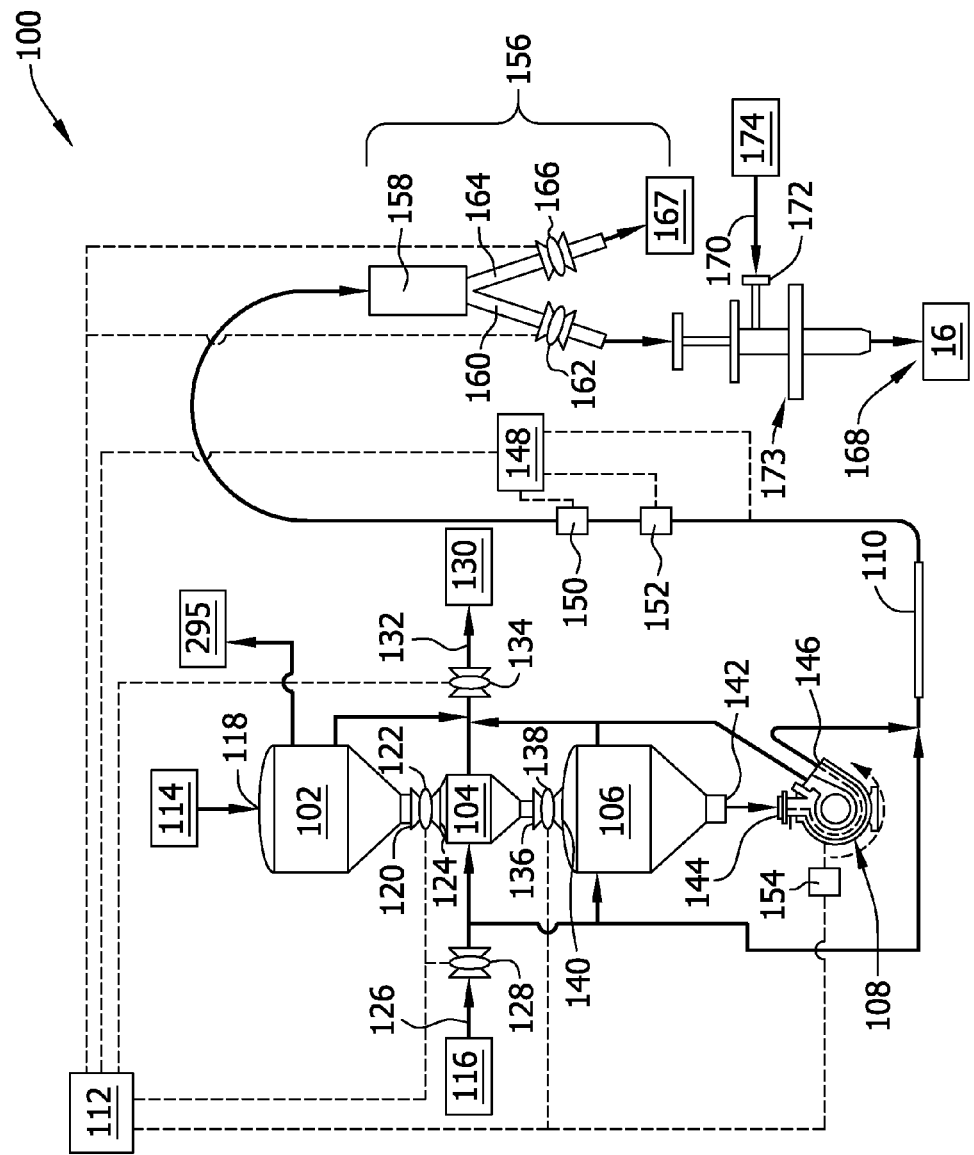
FIG. 2 is a schematic view of an exemplary solids supply system that may be used with the IGCC system shown in FIG. 1.
Figure 3:
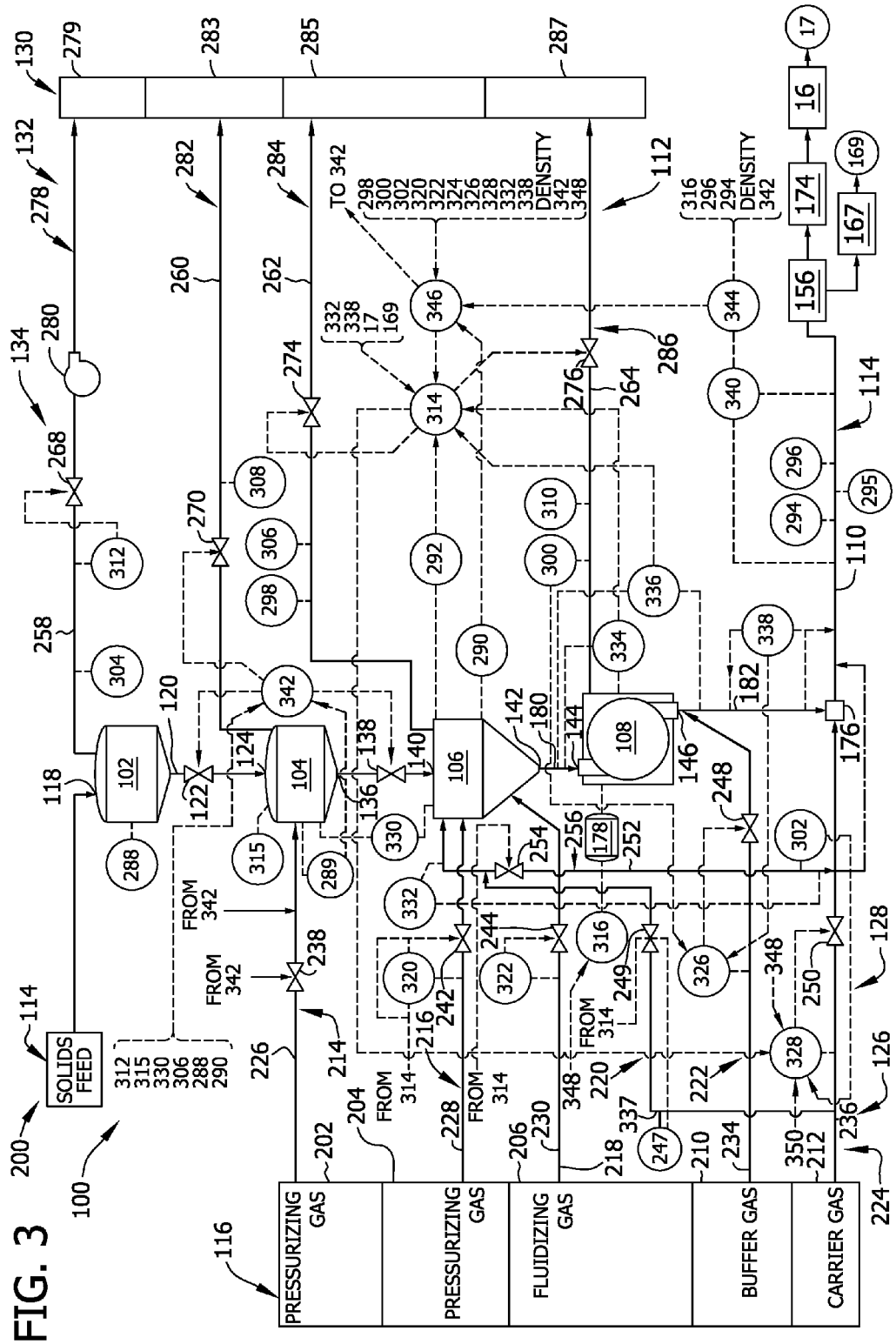
FIG. 3 is a schematic view of an exemplary pressure control system for use with the solids supply system shown in FIG. 2.
Figure 4:
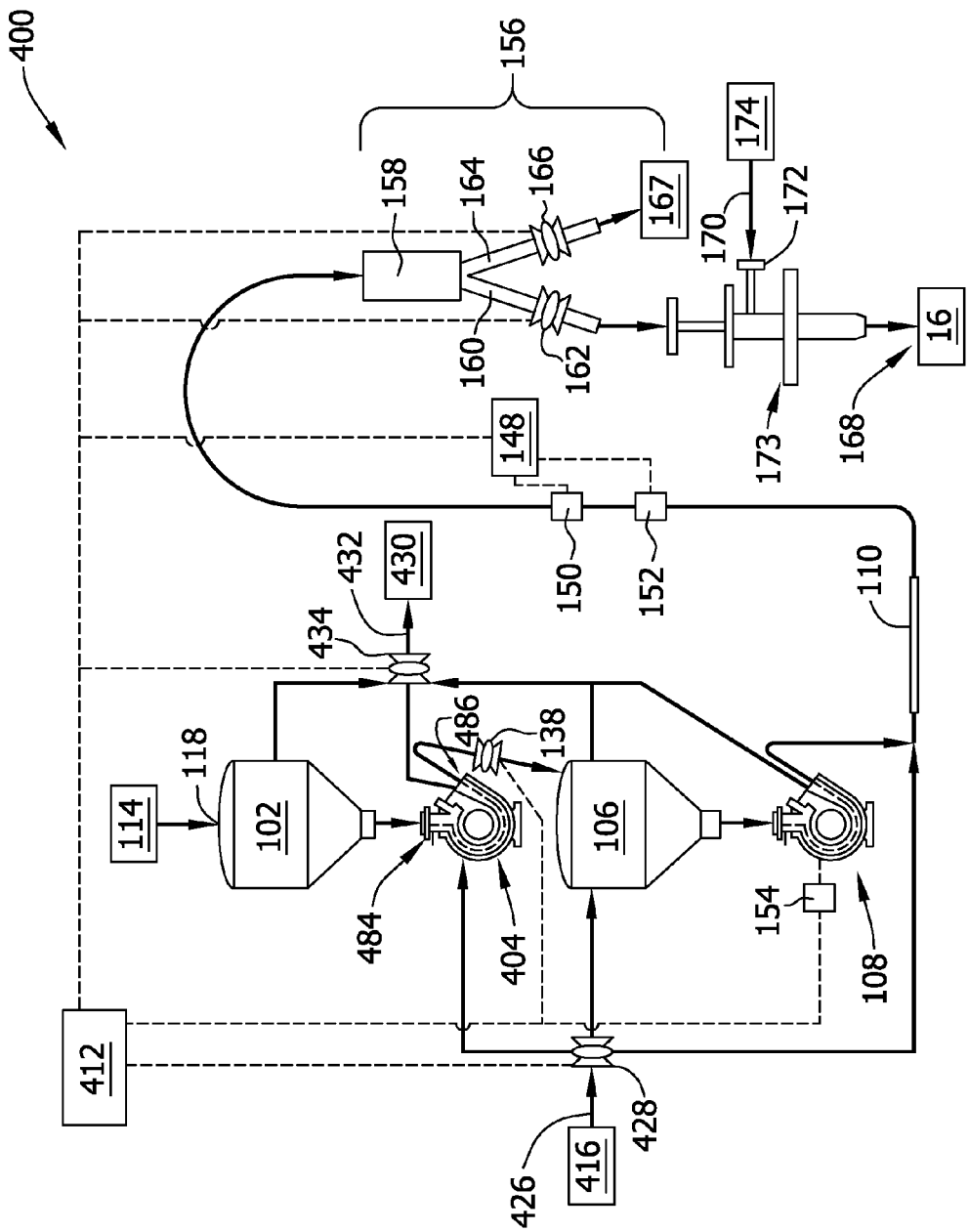
FIG. 4 is a schematic view of an alternative solids supply system that may be used with the IGCC system shown in FIG. 1.
Figure 5:
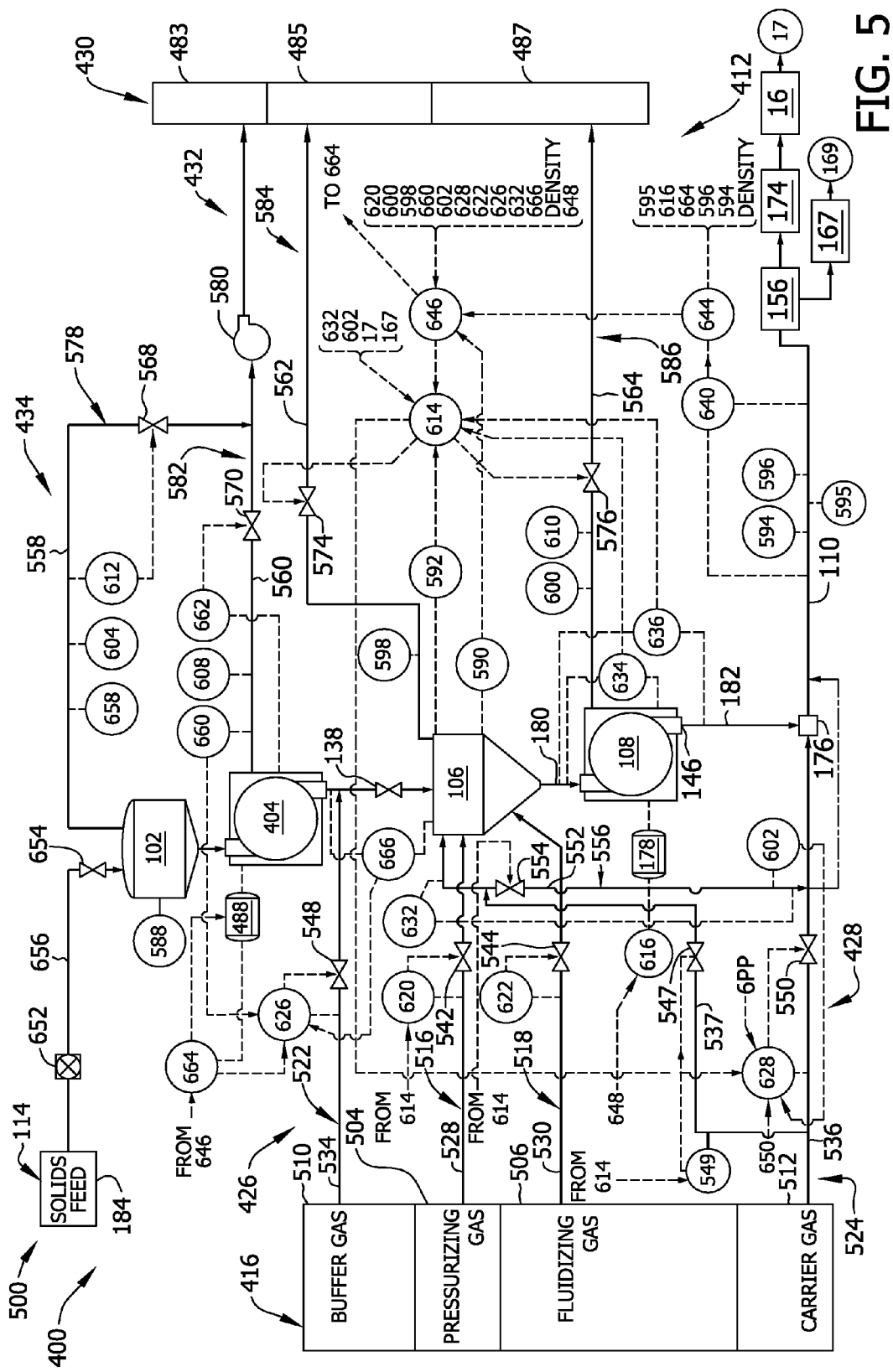
FIG. 5 is a schematic view of an exemplary pressure control system for use with the solids supply system shown in FIG. 4.

In FIGS. 2-5 control signals are represented by dotted lines and fluid and/or solids flows are represented by solid lines. Solids supply system 30 can include a lockhopper, as shown in FIGS. 2 and 3, a pressurizing feeder, as shown in FIGS. 4-5.

FIG. 2 is a schematic view of exemplary solids supply system 100 that may be used with system 10 (shown in FIG. 1) as solids supply system 30 (shown in FIG. 1). Solids supply system 100 is configured to channel fuel from a low pressure source, such as a first feed bin 102, to a high pressure receiving system, such as gasifier 16. Solids supply system 100 includes a plurality of components including a plurality of metering and pressurizing devices that are coupled upstream from gasifier 16 and that are used to channel fuel to gasifier 16. Specifically, in the exemplary embodiment, solids supply system 100 includes first feed bin 102, a pressurizing device 104, a second feed bin 106, a metering device 108, a conveying line 110, and at least one control system 112. In the exemplary embodiment, pressurizing device 104 is coupled downstream from first feed bin 102, second feed bin 106 is coupled downstream from pressurizing device 104, metering device 108 is coupled downstream from second feed bin 106, and conveying line 110 is coupled downstream from metering device 108. More specifically, components 102, 104, 106, 108, and 110 are coupled together such that a feed stock 114, such as coal, may be gravity fed through bins 102 and 106 and devices 104 and 108, as will be described in more detail below. Moreover, in the exemplary embodiment, a gas is injected into solids supply system 100 from a gas supply 116 to facilitate channeling feed stock 114 downstream.

Control system 112 is electrically coupled to each bin 102 and 106, devices 104 and 108, conveying line 110, and to additional downstream elements as will be described in more detail herein. Control system 112 selectively controls the operation of each bin 102 and 106, devices 104 and 108, and conveying line 110, as will be described in more detail herein with respect to FIG. 3, to control pressure within solids supply system 100. Control system 112 also functions as a pressure control system.

In the exemplary embodiment, feed stock 114 is channeled through solids supply system 100 into gasifier 16 at a high pressure. In the exemplary embodiment, feed stock 114 is a solid fuel such as coal. Alternatively, feed stock 114 may be any suitable fuel that enables solids supply system 100 to function as described herein. During operation, feed stock 114 is pressurized using a pressurized gas, as will be described in more detail herein.

More specifically, in the exemplary embodiment, feed stock 114 is initially channeled into first feed bin 102. First feed bin 102 is a low pressure feed bin and feed stock 114 is supplied to first feed bin 102 at a first pressure. In the exemplary embodiment, the first pressure is approximately equal to atmospheric pressure. More specifically, feed stock 114 is channeled into first feed bin 102 through an inlet 118, and feed stock 114 is discharged from first feed bin 102 through an outlet 120 through the use of an automatic control valve 122 coupled proximate outlet 120. For example, automatic valve 122 may be, but is not limited to being, an electrically, hydraulically, and/or pneumatically operated valve. Alternatively, valve 122 may be a manually-operated valve and/or any other valve that enables solids supply system 100 to function as described herein. In the exemplary embodiment, valve 122 is electrically coupled with control system 112 such that control system 112 selectively operates valve 122 between an open position that enables feed stock 114 to be discharged from first feed bin 102, and a closed position that substantially prevents feed stock 114 from being discharged from first feed bin 102. Further, valve 122 is operable to facilitate preventing high-pressure gas and solids from being blown back from pressurizing device 104 into first feed bin 102.

When valve 122 is in the open position, first feed bin 102 discharges feed stock 114 at the first pressure through outlet 120. Feed stock 114 is discharged downstream into pressurizing device 104 that pressurizes solids, such as feed stock 114. Specifically, in the exemplary embodiment, pressurizing device 104 is a lockhopper vessel. Alternatively, pressurizing device 104 is any pressurizing device that pressurizes solids and that enables solids supply system 100 to function as described herein. Feed stock 114 flows into pressurizing device 104 through an inlet 124.

Gas supply 116 is coupled in flow communication with pressurizing device 104, second feed bin 106, metering device 108, and conveying line 110 such that a gas flow from gas supply 116 at least partially pressurizes feed stock 114 within device 104 and/or 108 and/or bin 106. In the exemplary embodiment, gas supply 116 provides any pressurizing gas that facilitates pressurizing feed stock 114. For example, lockhopper vessels are usually pressurized with nitrogen, $CO_2$, or other inert gases that substantially prevent automatic ignition. Gas flow 126 is intermittingly channeled from gas supply 116 into pressurizing device 104 with the use of an automatic supply valve system 128 coupled therebetween. Supply valve system 128 includes a plurality of valves, as described in more detail below. Moreover, gas supply 116 may include more than one gas source that each supply gas to one or more of devices 104 and 108, bin 106, and conveyance line 110.

In the exemplary embodiment, automatic supply valve system 128 includes, but is not limited to including, electrically, hydraulically, and/or pneumatically operated valves. Alternatively or additionally, supply valve system 128 includes a manual valve and/or any other suitable valve that enables solids supply system 100 to function as described herein. In the exemplary embodiment, supply valve system 128 is coupled in electronic communication with control system 112 such that control system 112 selectively operates valve(s) of supply valve system 128 between an open position that enables gas flow 126 to be discharged into device 104 and/or 108 and/or bin 106, and a closed position that substantially prevents gas flow 126 from being discharged into device 104 and/or 108 and/or bin 106.

When a valve of supply valve system 128 is in the open position, a respective gas flow 126 pressurizes feed stock 114 from the first pressure to a second predetermined pressure within, for example, pressurizing device 104, as will be described in more detail below. In the exemplary embodiment, the second pressure of feed stock 114 is greater than the first pressure of feed stock 114. In one embodiment, the second pressure is approximately equal to the pressure required to supply feed stock 114 to gasifier 16. Alternatively, the second pressure of feed stock 114 may be slightly less than or slightly greater than the pressure required to supply feed stock 114 to gasifier 16 as described further below.

A return source 130, such as a vent, is also coupled in flow communication with bins 102 and/or 106 and/or devices 104 and/or 108 to enable a gas flow 132 to be channeled from bins 102 and/or 106 and/or devices 104 and/or 108 to one or more other components. An automatic return valve system 134 is coupled between bins 102 and 106 and devices 104 and 108 and return source 130 to control the flow of gas flow 132 from bins 102 and/or 106 and/or devices 104 and/or 108. For example, automatic return valve system 134 includes, but is not limited to including, electrically, hydraulically, and/or pneumatically operated valves. Alternatively or additionally, return valve system 134 includes a manual valve and/or any other suitable valve that enables solids supply system 100 to function as described herein. In the exemplary embodiment, return valve system 134 is electronically coupled to control system 112 such that control system 112 selectively operates valves of return valve system 134 between an open position in which gas flow 132 is discharged from bin 102 and/or 106 and/or device 104 and/or 108, and a closed position in which gas flow 132 is substantially prevented from being discharged from bin 102 and/or 106 and/or device 104 and/or 108. Moreover, return source 130 may include more than one return source from bin 102, bin 106, device 104, and/or device 108

In the exemplary embodiment, feed stock 114 is discharged intermittingly or cyclically, in a lockhopper system, from pressurizing device 104 through an outlet 136 with the use of an automatic valve 138 coupled to outlet 136. Automatic valve 138 may be, but is not limited to being, an electrically, hydraulically, and/or pneumatically operated valve. Alternatively, valve 138 may be a manual valve and/or any other suitable valve that enables solids supply system 100 to function as described herein. In the exemplary embodiment, valve 138 is electrically coupled to control system 112 such that control system 112 selectively operates valve 138 between an open position in which pressurized feed stock 114 (i.e., feed stock at the second pressure) is discharged from pressurizing device 104, and a closed position in which pressurized feed stock 114 (i.e., feed stock at the second pressure) is substantially prevented from being discharged from pressurizing device 104. Moreover, in the exemplary embodiment, positioning valves 122 and 138 in their closed positions facilitates maintaining the pressurized feed stock 114 at the second pressure by preventing flow between bin 102 and bin 106.

When valve 138 is in an open position, pressurizing device 104 discharges feed stock 114 at the second pressure from outlet 136 through valve 138. Feed stock 114 is discharged downstream into second feed bin 106 through an inlet 140, the discharging simultaneously displacing pressurized gas from second feed bin 106 into pressurizing device 104. Feed bin 106 maintains feed stock 114 at the second pressure before feed stock 114 is channeled through a feed bin outlet 142 into metering device 108.

Metering device 108 is an apparatus that channels feed stock 114 from a first high pressure zone at an inlet or suction side 144 to a second high pressure zone at an outlet or discharge side 146. In the exemplary embodiment, the first high pressure zone and second high pressure zones are maintained at approximately the same pressures. As such, in the exemplary embodiment, using control system 112, there is little if any pressure differential between suction side 144 and the discharge side 146 within metering device 108. In alternative embodiments, when pressurizing device 104 modifies the second pressure of feed stock 114 to be greater than or less than the pressure required to supply feed stock 14 to gasifier 16, control system 112 may cause a slight pressure differential to occur between suction side 144 and discharge side 146, as described in more detail below. By design, the pressure differential in such embodiments facilitates reducing or increasing, respectively, the feed stock pressure such that the feed stock pressure at discharge side 146 is approximately equal to the pressure required to supply feed stock 114 to gasifier 16. For example, in the alternative embodiment where the pressure of feed stock 114 is reduced, the pressure differential may be within a range of from about minus 10 psi to about 0 psi between suction side 144 and discharge side 146. Further, in the alternative embodiment where the pressure of feed stock 114 is increased, the pressure differential may be within a range of from about 0 psi to about 30 psi.

In the exemplary embodiment, metering device 108 is a rotary type feeder or screw type feeder. For example, metering device 108 may be a Posimetric® ("Posimetric" is a registered trademark of GE Energy located at 4200 Wildwood Parkway Atlanta, Ga.) feeder made by General Electric Company of Schenectady, N.Y. Posimetric® feeders are rotary disk type feeders that utilize the principle of solids lockup to transport and meter particulate solids, such as feed stock 114. The rotational speed of metering device 108 is controlled by a controllable speed motor (not shown). In some embodiments, metering device 108 may incorporate one or more flow restriction mechanisms (not shown), such as one or more dynamic plugs that restrict the flow of feed stock 114 and/or a gas associated with feed stock 114 through metering device 108. Alternatively, metering device 108 is any suitable metering device that enables solids supply system 100 to function as described herein.

Incorporation of such flow restriction mechanisms facilitates operation of metering device 108 in a pressure reducing or pressure increasing mode. Further, such flow restriction mechanisms facilitate reducing the susceptibility of feed stock 114 and/or gas associated with feed stock 114 to variations in pressure either upstream or downstream from metering device 108. Utilizing the principle of lockup and/or a frictional driving mechanism in metering device 108 to transport solids through metering device 108 facilitates decreasing the susceptibility of the solids flow being disrupted by pressure fluctuations or a pressure differential across the metering device 108. Incorporation of flow restriction devices may also facilitate reducing the ability of process gases to pass through metering device 108. As such, flow restriction mechanisms may be used in operational modes where the pressure is controlled to be substantially equal at the inlet and outlet of metering device 108.

Metering device 108 enables a substantially continuous and uniform supply of feed stock 114, at a high pressure, to conveying line 110. Conveying line 110 channels feed stock 114 substantially uniformly from metering device 108 to gasifier 16. Specifically, in the exemplary embodiment, gas flow 126 is continuously channeled into conveying line 110 to prevent a loss in pressure while feed stock 114 is channeled through conveying line 110 to gasifier 16. Gas flow 126 may be any suitable gas that enables solids supply system 100 to function as described herein. In the exemplary embodiment, control system 112 may control the flow of gas flow 126 into conveying line 110 via valve system 128.

In the exemplary embodiment, a monitoring system 148 may be electrically coupled with conveying line 110 to enable monitoring system 148 to calculate the flow of feed stock 114. Monitoring system 148 may include a flow measuring device 150 and a density measuring device 152 coupled in flow communication within conveying line 110 to measure various factors within solids supply system 100. Moreover, monitoring system 148 may also include a speed and power measuring device 154 electrically coupled to metering device 108 to measure various factors within solids supply system 100. Such measured factors may include, but are not limited to including, the pressure differential within conveying line 110, the speed of gas flow 126, the static pressure within conveying line 110, the speed and power of metering device 108, and/or the density and weight of feed stock 114. A predetermined algorithm stored within monitoring system 148 uses the measured factors to calculate the flow of feed stock 114 at any given time. Moreover, monitoring system 148 may be electrically coupled with control system 112 to facilitate controlling and/or monitoring the flow of feed stock 114 into gasifier 16. Specifically, control system 112 and/or monitoring system 148 facilitate a substantially uniform distribution of feed stock 114 into gasifier 16.

In the exemplary embodiment, solids supply system 100 also includes an inlet system 156 coupled in flow communication with conveying line 110 and gasifier 16. In the exemplary embodiment, inlet system 156 includes a branch 158 coupled in flow communication with conveying line 110, an inlet line 160 including a valve 162 coupled downstream from branch 158, and a return line 164 including a valve 166 coupled downstream from branch 158. Valve 162 is coupled to an inlet 168 of gasifier 16 and valve 166 is coupled to a recycle vent system 167. The use of branch 158 and valves 162 and 166 facilitates the channeling of pressurized feed stock 114 (i.e., the feed stock at the second pressure) to gasifier 16 or to recycle vent system 167.

Valve 162 is an automatic valve that is electrically coupled with control system 112 to enable control system 112 to selectively operate valve 162. Specifically, valve 162 is operable between an open position and a closed position. In the open position, feed stock 114 and/or gas is channeled from conveying line 110 into an inlet 168 of gasifier 16 when valve 166 is closed. In the closed position, feed stock 114 and/or gas is substantially prevented from being channeled into inlet 168.

Valve 166 is an automatic valve that is electrically coupled with control system 112 such that control system 112 selectively operates valve 166 between an open position and a closed position. In the open position and when valve 162 is closed, feed stock 114 and/or gas is channeled to recycle vent system 167 to establish an initial flow of feed stock 114 and/or gas prior to starting gasifier 16, and for clearing conveying line 110 and other components of feed system 100 of feed stock 114 and/or gas after gasifier 16 is shut down. When valve 166 is in the closed position, feed stock 114 and/or gas is substantially prevented from being channeled to recycle vent system 167.

When feed stock 114 and/or gas are channeled into gasifier inlet 168, a gas flow 170 is channeled through a second inlet 172 of gasifier 16. Specifically, in the exemplary embodiment, gas flow 170 is an oxygen and/or moderator stream that is channeled from an oxygen and/or moderator source 174. The oxygen and/or moderator stream reacts with feed stock 114 and/or gas within feed stock 114.

FIG. 3 is a schematic view of an exemplary pressure control system 200 for use with solids supply system 100 (shown in FIG. 2). Pressure control system 200 includes bins 102 and 106, pressurizing device 104, metering device 108, control system 112, gas supply 116, valve system 128, valve system 134, and return source 130. Further, pressure control system 200 is coupled in communication with inlet system 156 (shown in FIG. 2), gasifier 16 (shown in FIG. 1), and recycle vent system 167.

Gas supply 116 includes a first pressurizing gas source 202, a second pressurizing gas source 204, a fluidizing gas source 206, a buffer gas source 210, and a carrier gas source 212 each having a respective gas flow 214, 216, 218, 222, and 224, collectively referred to as gas flow 126. In the exemplary embodiment, gas source 202 is coupled in flow communication with pressurizing device 104 to supply first pressurizing gas flow 214, pressurizing gas source 204 is coupled in flow communication with second feed bin 106 to supply second pressurizing gas flow 216, fluidizing gas source 206 is coupled in flow communication with second feed bin 106 provide fluidizing gas flow 218, buffer gas source 210 is coupled in flow communication downstream of metering device 108 to provide buffer gas flow 222, and carrier gas source 212 is coupled in flow communication with conveying line 110 to provide carrier gas flow 224. In the exemplary embodiment, carrier gas source 212 is coupled in flow communication with conveying line 110 via a mixing device 176 that is coupled in flow communication with metering device 108. Alternatively, mixing device 176 is integral with metering device 108, and/or carrier gas 212 may be at least partially combined with feed stock 114 either at or upstream of the inlet of mixing device 176.

Conveying line 110 is coupled in flow communication with inlet system 156. In the exemplary embodiment, inlet system 156 is coupled in flow communication with recycle vent system 167 and with a gasifier injector 173. Gasifier injector 173 is coupled in flow communication with gasifier 16.

Each gas flow 214, 216, 218, 222, and 224 is channeled through a respective line. More specifically, gas flow 214 is channeled through a first pressurizing gas line 226, gas flow 216 is channeled through a second pressurizing gas line 228, fluidizing gas flow 218 is channeled through a fluidizing gas line 230, buffer gas flow 222 is channeled through a buffer gas line 234, and carrier gas flow 224 is channeled through a carrier gas line 236. Although lines 226, 228, 230, 234, and 236 are shown as single lines in the figures, it should be understood that any of lines 226, 228, 230, 234, and/or 236 can includes parallel lines that can be used for rapid changes in pressure and/or throughput or for smaller adjustments during normal operation.

Supply valve system 128 is coupled in flow communication between gas sources 202, 204, 206, 210, and 212 and bin 102 and/or 106, device 104 and/or 108, and/or conveying line 110. As such, supply valve system 128 includes at least one valve for each gas source 202, 204, 206, 210, and 212. More specifically, supply valve system 128 includes a first pressurizing valve 238, a second pressurizing valve 242, a fluidizing valve 244, a buffer valve 248, and a carrier valve 250. Valve 238 is coupled along gas line 226 in flow communication between gas source 202 and pressurizing device 104 to control gas flow 214. Pressurizing valve 242 is coupled along pressurizing gas line 228 in flow communication between pressurizing gas source 204 and second feed bin 106 to control pressurizing gas flow 216. Fluidizing valve 244 is coupled along fluidizing gas line 230 in flow communication between fluidizing gas source 206 and second feed bin 106 to control fluidizing gas flow 218. Buffer valve 248 is coupled along buffer gas line 234 in flow communication between buffer gas source 210 and downstream of metering device 108 to control buffer gas flow 222. Carrier valve 250 is coupled along carrier gas line 236 in flow communication between carrier gas source 212 and mixing device 176 to control carrier gas flow 224. Each valve 238, 242, 244, 248, and 250 is communicatively coupled with control system 112, as described in more detail below.

In some embodiments, the first pressurizing gas, the second pressurizing gas, the fluidizing gas, and the buffer gas may be inert gases, and the carrier gas may be an inert gas or synthesis gas (syngas). Suitable inert gases include, but are not limited to, nitrogen and carbon dioxide. In the exemplary embodiment, inert gases are used to facilitate minimizing gas treating requirements of related vent streams. In an alternative embodiment, first pressurizing gas source 202, second pressurizing gas source 204, fluidizing gas source 206, and buffer gas source 210 may be provided from a common gas source (not shown). The common gas source may then be coupled in flow communication with lines 226, 228, 230, and 234. Further, the common gas source may be used to replace or supplement carrier gas source 212 by providing gas through line 236. For example, the common gas source may be used to supply carrier gas through line 236 in feed system 100 during startup, and gas source 212 may be used to supply carrier gas through line 236 in feed system 100 during normal operation.

A bypass line 252 couples second feed bin 106 and carrier gas line 236 in flow communication. A bypass valve 254 is coupled along bypass line 252 to control a bypass gas flow 256 through bypass line 252. Bypass valve 254 is communicatively coupled with control system 112, as described in more detail below. In one embodiment, bypass line 252 is additionally or alternatively in fluid communication with conveying line 110 downstream from mixing device 176, or with line 182 at an inlet of or upstream from mixing device 176. In some embodiments, a gas supply line 337 is used to supply carrier gas to second feed bin 106

To remove gas from components of solids supply system 100, pressure control system 200 includes a plurality of vent or return lines. More specifically, a first feed bin return line 258 couples first feed bin 102 in flow communication with a first feed bin vent 279 included in return source 130, a pressurizing device return line 260 couples pressurizing device 104 in flow communication with a pressurizing device vent 283 included in return source 130, a second feed bin return line 262 couples second feed bin 106 in flow communication with a first high pressure vent 285 included in return source 130, and a metering device return line 264 couples metering device 108 in flow communication with a second high pressure vent 287 included in return source 130. Return valve system 134 is coupled in flow communication along return lines 258, 260, 262, and 264 to control gas flows through each return line 258, 260, 262, and 264. Although lines 258, 260, 262, and 264 are shown as single lines in the figures, it should be understood that any of lines 258, 260, 262, and/or 264 can include parallel lines that can be used for rapid changes in pressure and/or throughput or for smaller adjustments during normal operation.

More specifically, return valve system 134 includes a first feed bin return valve 268, a pressurizing device return valve 270, a second feed bin return valve 274, and a metering device return valve 276. First feed bin return valve 268 is coupled along first feed bin return line 258 to control a first feed bin gas flow 278. In the exemplary embodiment, a pump 280, such as a vacuum blower, is coupled along first feed bin return line 258. Pressurizing device return valve 270 is coupled along pressurizing device return line 260 to control a pressurizing device gas flow 282. Second feed bin return valve 274 is coupled along second feed bin return line 262 to control a second feed bin gas flow 284. Metering device return valve 276 is coupled along metering device return line 264 to control a metering device gas flow 286. Each valve 268, 270, 274, and 276 is communicatively coupled to control system 112 for control thereof.

Control system 112 includes a plurality of sensors, transmitters, and/or controllers positioned throughout pressure control system 200. In the exemplary embodiment, control system 112 includes level transmitters 288, 289, and 290, pressure transmitters 292, 294, and 315, a temperature transmitter 296, flow transmitters 295, 298, 300, and 302, analyzer sensors 304, 306, 308, and 310, pressure controllers 312 and 314, a speed controller 316, flow controllers 320, 322, 326, and 328, a differential pressure transmitter 330, differential pressure controllers 332, 334, 336, 338, and 340, a lockhopper controller 342, a primary controller 344, and a secondary controller 346. Pressure transmitters, pressure controllers, differential pressure transmitters, and differential pressure controllers are also referred to herein as pressure sensing devices. Further, in the exemplary embodiment, control system 112 is configured to receive pressure data from a gasifier pressure sensor 17 and a recycle vent system pressure sensor 169.

Level transmitter 288 is coupled in communication with first feed bin 102 to measure a level within first feed bin 102. Level transmitter 289 is coupled in communication with pressurizing device 104 to measure a level within pressurizing device 104. Level transmitter 290 is coupled in communication with second feed bin 106 to measure a level within second feed bin 106. Pressure transmitter 292 is coupled in communication with second feed bin 106 to measure a pressure within second feed bin 106. Pressure transmitter 294 is coupled in communication with conveying line 110 to measure a pressure within conveying line 110. Temperature transmitter 296 is coupled in communication with conveying line 110 to measure a temperature within conveying line 110. Flow transmitter 302 is coupled in communication with bypass line 252 to measure a flow within bypass line 252. Flow transmitter 298 is coupled in communication with second feed bin return line 262 to measure a flow within second feed bin return line 262. Flow transmitter 300 is coupled in communication with metering device return line 264 to measure a flow within metering device return line 264. Flow transmitter 295 is coupled in communication with conveying line 110 to measure a flow within conveying line 110. In an alternative embodiment, flow transmitter 295 may be coupled in communication with differential pressure controller 340, pressure transmitter 294, or temperature transmitter 296 to measure a flow within conveying line 110. In an alternative embodiment, the flow in conveying line 110 is measured by any suitable method that enables control system 200 to function as described herein.

Analyzer 304 is coupled in communication with first feed bin return line 258 to detect a presence of at least one predetermined chemical, such as CO or $H_2$, within first feed bin return line 258. Analyzer 308 is coupled in communication with pressurizing device return line 260 to detect a presence of at least one predetermined chemical, such as CO or $H_2$, within pressurizing device return line 260. Analyzer 306 is coupled in communication with second feed bin return line 262 to detect a presence of at least one predetermined chemical, such as CO or $H_2$, within second feed bin return line 262. Analyzer 310 is coupled in communication with metering device return line 264 to detect a presence of at least one predetermined chemical, such as CO or $H_2$, within metering device return line 264. If the predetermined chemical is detected by at least one of analyzers 304, 306, 308, and/or 310, it can be determined whether a process gas backflow is occurring in solids supply system 100.

Pressure controller 312 is coupled in communication with first feed bin return line 258 and first feed bin return valve 268 to measure a pressure within first feed bin return line 258 and control first feed bin return valve 268 using the measured pressure. Speed controller 316 is coupled in communication with a motor 178 of metering device 108 to control motor 178 based on a demand signal 348.

Flow controller 320 is coupled in communication with pressurizing gas line 228 and pressurizing valve 242 to measure a flow within pressurizing gas line 228 and control pressurizing valve 242 using the measured flow. Flow controller 322 is coupled in communication with fluidizing gas line 230 and fluidizing valve 244 to measure a flow within fluidizing gas line 230 and control fluidizing valve 244 using the measured flow. In an alternative embodiment, pressurizing valve 242 is controlled directly by pressure controller 314 with flow controller 320 operating as a flow sensor providing a flow rate to pressure controller 314.

Flow controller 326 is coupled in communication with buffer gas line 234 and buffer valve 248 to measure a flow within buffer gas line 234 and control buffer valve 248 using the measured flow. Flow controller 326 is also coupled in communication with differential pressure controller 338 and flow transmitter 300 to receive signals from differential pressure controller 338 and flow transmitter 300. Flow controller 328 is coupled in communication with carrier gas line 236 and carrier valve 250 to measure a flow within carrier gas line 236 and control carrier valve 250 using the measured flow. Flow controller 328 also is coupled in communication with flow transmitter 302 and pressure controller 314 to receive signals therefrom. Flow controller 328 also receives a demand signal 348 indicating the solids feed rate and solids loading ratio (SLR) signal 350 indicating a solids loading ratio of solids supply system 100.

Differential pressure transmitter 330 is coupled in communication with pressurizing device 104 and second feed bin 106 to measure a differential pressure between pressurizing device 104 and second feed bin 106. Differential pressure controller 332 is coupled in communication with bypass line 252 on each side of bypass valve 254 to measure a differential pressure along bypass line 252. Differential pressure controller 334 is coupled in communication with a feed line 180 upstream of metering device 108 and with metering device 108 to measure a differential pressure between feed line 180 and metering device 108. Differential pressure controller 336 is coupled in communication with feed line 180 and a feed line 182 downstream of metering device 108 to measure a differential pressure between feed line 180 and feed line 182. As such, differential pressure controller 336 measures a differential pressure across metering device 108. Differential pressure controller 338 is coupled in communication with feed line 182 upstream and downstream of a point where feed line 182 is in flow communication with buffer gas line 234. Differential pressure controller 338 is configured to measure a differential pressure along feed line 182. Differential pressure controller 340 is coupled in communication with an upstream point on conveying line 110 and a downstream point on conveying line 110 to measure a differential pressure along conveying line 110.

Differential pressure controllers 332, 334, 336, and 338 are each coupled in communication with pressure controller 314 to transmit the differential pressures to pressure controller 314, and differential pressure controllers 332 and 338 are each coupled in communication with at least secondary controller 346 to transmit the differential pressures to secondary controller 346. Differential pressure controller 338 is further coupled in communication with flow controller 326 to control buffer valve 248 via flow controller 326. Differential pressure controller 340 is coupled in communication with primary controller 344 to transmit the differential pressure to primary controller 344.

Lockhopper controller 342 is configured to control a pressure within pressurizing device 104 to, for example, achieve a desired or predetermined pressure within pressurizing device 104. In the exemplary embodiment, lockhopper controller 342 is coupled in operative communication with valves 122, 138, 238, and 270, and to control valves 122 and 270 to adjust a pressure within pressurizing device 104. Lockhopper controller 342 receives signals from pressure controller 312, pressure controller 314, differential pressure transmitter 330, analyzer 306, level transmitter 290, level transmitter 288, and secondary controller 346 to determine how to adjust valves 122, 138, 238, and 270 to achieve the desired pressure within pressurizing device 104. For example, lockhopper controller 342 may use valve 238 and valve 270 to control a rate of pressurization and depressurization of pressurizing device 104.

Primary controller 344 is configured to calculate a net rate of change of solids within solids supply system 100. More specifically, primary controller 344 calculates a rate of change of solids contained in high pressure feed bin 106 based on a rate or quantity of solids being discharged from pressurizing device 104 and a rate of solids metered by metering device 108 into conveying line 110. In the exemplary embodiment, primary controller 344 receives signals from differential pressure controller 340, speed controller 316, temperature transmitter 296, pressure transmitter 294, and lockhopper controller 342 and a density measurement of feed stock 114. Primary controller 344 outputs a differential rate to secondary controller 346, which transmits a signal to pressure controller 314. Pressure controller 314 uses the differential rate signal to determine a rate of change in a gas volume within second feed bin 106. As such, pressure controller 314 can slow a rate of pressurization of second feed bin 106 when the net quantity of solids is increasing in second feed bin 106 and increase the rate of pressurization when the net quantity of solids in second feed bin 106 is decreasing.

Secondary controller 346 is configured to calculate flow rates and levels through solids supply system 100 to control a rate of change of pressure controller 314. More specifically, secondary controller receives the differential volume of solids from primary controller 344 and other flows, levels, and pressures through solids supply system 100 to determine a rate of change for pressure controller 314 and for lockhopper controller 342. In the exemplary embodiment, secondary controller 346 receives signals from primary controller 344, level transmitter 290, flow transmitter 300, flow transmitter 298, flow transmitter 302, flow controller 320, flow controller 322, flow controller 324, flow controller 326, flow controller 328, differential pressure controller 332, and differential pressure controller 338 and the density measurement. Secondary controller 346 outputs rate of change signals to lockhopper controller 342 and pressure controller 314. As such, secondary controller 346 facilitates operation of pressure controller 314, by taking into account net changes occurring in variables, such as demand, and pressuring gas, vent gas and other gas flows that could impact the pressure or quantity of gas or solids within second feed bin 106.

Pressure controller 314 is configured to control a pressure within second feed bin 106 using at least two pressure measurements and/or differential pressure measurements. More specifically, pressure controller 314 receives signals from secondary controller 346, pressure transmitter 292, differential pressure controller 336, differential pressure controller 332, differential pressure controller 338, differential pressure controller 334, and a measurement of pressure within gasifier 16 from gasifier pressure sensor 17 and/or a measurement of pressure in recycle vent system 176 from vent system pressure sensor 169. A rate of the change in pressure within second feed bin 106 is determined by pressure controller 314 based on the signal from secondary controller 346. Pressure controller 314 may transmit signals to flow controller 328, flow controller 247, flow controller 320, bypass valve 254, return valve 274, and return valve 276.

In some embodiments, the pressure in bin 106 may be increased or decreased with pressure controller 314. When increasing the pressure, pressure controller 314 facilitates channeling pressurizing gas 204 via line 228 through valve 242 to bin 106. In such an embodiment, second feed bin 106 is pressurized by pressurizing gas flow 216. When decreasing the pressure, pressure controller 314 facilitates venting gas from bin 106 to first high pressure vent 285 via valve 274 and line 262. In embodiments where the pressure in bin 106 is lower than the carrier gas pressure, the bin pressure also may be increased with differential pressure controller 332 and/or pressure controller 314 via line 252. Further, valve 250 may be relocated to a position in carrier gas line 110 downstream from the connection of line 252 at line 110 and upstream from mixing device 176 such that the off-take of carrier is enabled at a higher pressure. Moreover, second feed bin 106 may be pressurized from carrier gas source 212 via line 337. In embodiments where the pressure in bin 106 is higher than the carrier gas pressure, the pressure in bin 106 may be decreased with differential pressure controller 332 and/or pressure controller 314 via valve 254 and line 256. In embodiments where the pressure in bin 106 is to be maintained at substantially the same pressure as the carrier gas pressure in line 110 between valve 250 and mixing device 176, bypass valve 254 may be omitted from pressure control system 200 or replaced with an alternate flow restricting device such as a flow restriction orifice (not shown). In such embodiments, a differential pressure measurement from differential pressure transmitter 332 and/or a flow measurement from flow transmitter 302 are used by pressure controller 314 and flow controller 328 to maintain a flow rate of carrier gas flow 224 being channeled into mixing device 176.

To fill and pressurize pressurizing device 104, feed stock 114 is discharged into pressurizing device 104 at a first pressure with valve 122 open and with valves 138, 238, and 270 closed. Valve 122 is then closed and valve 238 is opened, which channels first pressurizing gas flow 214 into pressurizing device 104 at a high pressure, thereby pressurizing feed stock 114. When the pressure in pressurizing device 104 is substantially equal to the pressure in bin 106, pressurizing gas valve 242 is closed. Valve 138 is then opened to discharge the pressurized feed stock 114 into second feed bin 106, which displaces an equal volume of gas from second feed bin 106 back into pressurizing device 104. After transferring feed stock 114 from pressurizing device 104 into second feed bin 106, valve 138 is closed. The pressure in feed bin 106 is then reduced by opening valve 270 to vent gas through vent line 260. Vent valve 270 is then closed to continue the fuel feeding process. In the exemplary embodiment, pressure controller 314 and/or lockhopper controller 342 use signals from level transmitter 288, analyzer 304, pressure controller 312, differential pressure transmitter 330, flow controller 318, and analyzer 308 to control valves 122, 138, 238, 268, and/or 270 and/or pump 280. As such, pressure control system 200 is configured to control a pressure within pressurizing device 104 and/or first feed bin 102 to achieve a desired feed stock pressure through solids supply system 100.

To minimize the potential of process gas backflow through pressurizing device return line 260, buffer gas flow 222 is channeled downstream of metering device 108 to create a higher pressure at outlet 146 of metering device 108 than at mixing device 176. In the exemplary embodiment, pressure controller 314 is configured to receive signals from at least one of differential pressure controller 334, differential pressure controller 338, flow controller 326, flow transmitter 300, and/or analyzer 310 to control valves 248 and/or 276.

Pressures are properly identified and controlled within solids supply system 100 so that pressure fluctuations, and the accompanying gas and particle velocity fluctuations, are kept to a minimum. Such identification and control can be especially important during transitions, such as startup, and changes in throughput and SLR. In the exemplary embodiment, differential pressure controller set points and/or controls are adjusted to account for system properties and/or specifications, such as metering device 108 speed, solids flow rates, solids levels, feed properties (i.e. type, moisture content, density, particle size distribution, permeability), gas leak rates, and/or any other suitable properties and/or specifications. The set points and/or controls are used to control a pressure within second feed bin 106 to, in turn, control a pressure within metering device 108. The desired pressure set points can be achieved by implementing two types of context-based controls.

The first type of control is embodied as pressure controller 314. Pressure controller 314 uses a combination of two or more pressure or differential pressure measurements, where a set point of at least pressure controller 314 is adjusted based upon a set point and/or actual value of at least one other pressure or differential pressure controller, such as measurements at differential pressure controller 332 and/or differential pressure controller 336. In the exemplary embodiment, pressure controller 314 provides an estimate of a required set point for a pressure of second feed bin 106 based on a downstream pressure adjusted by a transfer function that estimates a pressure drop between second feed bin 106 and the downstream pressure. For example, if the feed is being channeled towards gasifier 16, pressure controller 314 may use the pressure from pressure transmitter 17 as the downstream pressure, and if the feed is being channeled towards recycle vent system 167, pressure controller 314 may use the pressure from pressure transmitter 169 as the downstream pressure. The estimated set point is fine-tuned using a readily defined pressure drop set point across a component or increment of solids supply system 100, for example, a pressure drop across metering device 108 immediately downstream of second feed bin 106 is used to fine-tune the estimated set point. Other differential pressures that can additionally or alternatively be used to adjust the set point include, but are not limited to including, a differential pressure across second feed bin 106 and metering device 108, a differential pressure across a portion of conveying line 110, and/or a differential pressure across valve 254. The estimated set point is used to control the pressure within second feed bin 106. In an alternative embodiment, the pressure within second feed bin 106 may be controlled using an estimated set point for a differential pressure between second feed bin 106 and gasifier 16 and/or, when recycle/vent system 167 is in use, between feed bin 106 and recycle vent system 166. The estimated set point is then fine tuned using a static pressure at outlet 146 of metering device 108 based on the pressure in second feed bin 106 and a desired change in pressure across metering device 108.

The use of a combination of measurements of pressure or differential pressure from different transmitters and/or controllers is particularly beneficial because the potential problems of relying on one or the other alone as the control input are avoided. For example, using the gasifier pressure and transfer function alone will control the pressure of second feed bin 106 to be close to the actual required set point, but may lead to instabilities in the pressure distribution and flows in solids supply system 100 and the downstream processes due to the difference between the predicted and actual required set point. Further, by using the metering device 108 differential pressure alone, even with moderate errors in the pressure of second feed bin 106, could lead to swings in pressures and flows as the differential pressure control attempts to achieve the correct differential pressure.

The second type of control is embodied by primary controller 344 and secondary controller 346. Such a control uses information regarding an effect of other controllers and equipment in solids supply system 100 to tune or adjust the manner in which a given controller or set of controllers operate. For example, using the rate at which pressurizing gas flow 216 is added to second feed bin 106, which may contain variable quantities of solids, takes into account an actual void volume within second feed bin 106 that the gas will occupy and how the actual void volume is affected by any on-going changes in the rate of solids flow into and out of second feed bin 106.

When bypass line 252 is present, pressure controller 314 uses at least two pressure and/or differential pressure measurements to control the pressure within second feed bin 106. More specifically, pressure controller 314 uses a pressure measurement from pressure transmitter 292 and a differential pressure measurement from differential pressure controller 332 to control bypass valve 254. Although measurements from pressure transmitter 292 and differential pressure controller 332 are described herein, it should be understood that other combinations of two or more pressure and/or differential pressure measurements that are in communication with the active flow path of feed stock 114, including and downstream from second feed bin 106, can be used by pressure controller 314 to control bypass valve 254. In the exemplary embodiment, pressure controller 314 uses the signal from secondary controller 346 to determine a rate of change of bypass valve 254 to control a rate of change of the pressure within second feed bin 106. Pressure controller 314 also sends a signal to flow controller 328 regarding a direction and/or an amount of flow through bypass valve 254 such that carrier gas flow 224 can be adjusted accordingly. Flow transmitter 302 additionally or alternatively transmits a flow measurement to flow controller 328 to control carrier gas flow 224.

When bypass line 252 is omitted, pressure controller 314 uses at least two pressure and/or differential pressure measurements to control the pressure within second feed bin 106. More specifically, pressure controller 314 may use a pressure measurement from pressure transmitter 292 and a differential pressure measurement from differential pressure controller 336 to control pressurizing valve 242. Although measurements from pressure transmitter 292 and differential pressure controller 336 are described herein, it should be understood that other combinations of two or more pressure and/or differential pressure measurements that are in communication with the active flow path of feed stock 114, including and downstream from second feed bin 106, can be used by pressure controller 314 to pressurizing valve 242. In the exemplary embodiment, pressure controller 314 uses the signal from secondary controller 346 to determine a rate of change of pressurizing valve 242 to control a rate of change of the pressure within second feed bin 106. Further, because gas is not vented from second feed bin 106 to carrier gas line 236 via bypass line 252 in this embodiment, pressure controller 314 also controls valves 274 and 276 to control the pressure within second feed bin 106.

In some embodiments, pressure controller 314 is used without primary controller 344 and/or secondary controller 346. For example, in one embodiment, pressure controller 314 may be used with differential pressure controller 332 and/or differential pressure controller 336, pressure transmitter 292, and flow transmitter 302, adjusting the rates of pressurization and depressurization based on the quantity and rate of change in the quantity of solids in second feed bin 106 measured by level transmitter 290. Further, in one embodiment, pressure controller 314 is used with differential pressure controller 332 and/or differential pressure controller 336, pressure transmitter 292, and flow transmitter 302 without an adjustment for the quantity and/or rate of change in the quantity of solids in second feed bin 106.

Differential pressure controller 334 is used to limit an undesirable flow of gas through metering device 104 to upstream or downstream components of fuel supply system 100, either of which could disrupt the flow of feed stock 114 from system 100. For example, if the pressure at an inlet 144 of metering device 108 is lower than within metering device 108, gas may flow through outlet 146, which interferes with the flow of solids into metering device 108. In the exemplary embodiment, differential pressure controller 334 substantially prevents the undesirable flow by controlling valve 276, maintaining a pressure differential between inlet 144 and within metering device 108. The set point for the pressure differential may be adjusted based on a related static pressure, such as a static pressure associated with bin 106 or metering device 108. Further, the resulting vent flow through line 264 from metering device 108 measured by flow transmitter 300 may be used as an input to flow controller 326. For example, in one embodiment, the set point for flow controller 326 may be substantially equal to the vent gas flow adjusted by an incremental and/or multiplicative factor. Moreover, the set point for buffer gas flow also may be adjusted based on a static pressure, such as a static pressure associated with bin 106, metering devise 108, line 182, and/or mixing device 176.

FIG. 4 is a schematic view of an alternative embodiment of a solids supply system 400 that may be used with IGCC system 10. Solids supply system 400 is substantially similar to solids supply system 100 (shown in FIGS. 2 and 3) and similar components are identified with the same reference numerals used in FIGS. 1-5. Notably, solids supply system 400 does not include pressurizing device (i.e. a lockhopper) 104 and valve 122 (both shown in FIG. 2). Rather, in the exemplary embodiment, solids supply system 400 includes a pressurizing device 404 that is coupled between bins 102 and 106. Pressurizing device 404 is a pressurizing feeder that at least partially pressurizes feed stock 114. Further, solids supply system 400 includes a gas supply 416, a supply valve system 428, a return valve system 434, and a return source 430 that are similar to gas supply 116, supply valve system 128, return valve system 134, and return source 130, respectively, but include components for use with pressurizing device 404.

In the exemplary embodiment, pressurizing device 404 is coupled downstream of first feed bin 102 and upstream of second feed bin 106. Specifically, pressurizing device 404 channels feed stock 114 from a first pressure zone at an inlet or suction side 484 to a second pressure zone at an outlet or discharge side 486. The first pressure zone is at a first pressure and second pressure zone is at a second pressure that is higher than first pressure. In other words, pressurizing device 404 increases the pressure of feed stock 114 between suction side 484 and discharge side 486.

In the exemplary embodiment, pressurizing device 404 is a rotary type feeder or screw type feeder. For example, pressurizing device 404 may be a Posimetric® ("Posimetric" is a registered trademark of GE Energy located at 4200 Wildwood Parkway Atlanta, Ga.) feeder made by General Electric Company of Schenectady, N.Y. Posimetric® feeders are rotary disk type feeders that utilize the principle of solids lockup to transport and meter particulate solids, such as feed stock 114. The rotational speed of pressurizing device 404 is controlled by a controllable speed motor 488 (shown in FIG. 5) to produce the desired flow rate of feed stock 114 from metering device 108. Pressurizing device 404 substantially uniformly pressurizes and supplies a flow of feed stock 114 to second feed bin 106. In some embodiments, pressurizing device 404 may incorporate a flow restriction mechanism (not shown), such as a dynamic plug that restricts the flow of feed stock 114 or a gas associated with feed stock 114. Alternatively, pressurizing device 404 is any suitable metering device that enables solids supply system 100 to function as described herein.

Operation of solids supply system 400 is substantially similar to operation of solids supply system 100. However, in contrast to operation of solids supply system 100, solids supply system 400 does not pressurize feed stock 114 with first pressurizing gas flow 214 (shown in FIG. 3) and/or with pressurizing device 104 (shown in FIGS. 2 and 3). Rather, solids supply system 400 pressurizes feed stock 114 from the first pressure to the second pressure by operating pressurizing device 404. Specifically, feed stock 114 is channeled from first feed bin 102 into pressurizing device 404. Pressurizing device 404 feeds feed stock 114 from first pressure zone at suction side 484 to second pressure zone at discharge side 486 such that pressurizing device 404 increases the pressure of feed stock 114 between suction side 484 and discharge side 486. In the exemplary embodiment, pressurizing device 404 substantially uniformly pressurizes and supplies a flow of feed stock 114 to second feed bin 106 using pressure control system 500 (shown in FIG. 5). Pressures within solids supply system 400 are controlled using a pressure control system 500. In a particular embodiment, pressure control system 500 controls a gas flow 426 from gas supply 416 using supply valve system 428 and a gas flow 432 to return source 430 using return valve system 434.

FIG. 5 is a schematic view of exemplary pressure control system 500 for use with solids supply system 400. Pressure control system 500 includes bins 102 and 106, pressurizing device 404, metering device 108, control system 412, gas supply 416, supply valve system 428, return valve system 434, and return source 430.

Gas supply 416 includes a buffer gas source 510, a second pressurizing gas source 504, a fluidizing gas source 506, and a carrier gas source 512 each having a respective gas flow 522, 516, 518, and 524, collectively referred to as gas flow 426 (shown in FIG. 4). More specifically, buffer gas source 510 is coupled in flow communication downstream of pressurizing device 404 to supply buffer gas flow 522, pressurizing gas source 504 is coupled in flow communication with second feed bin 106 to supply second pressurizing gas flow 516, fluidizing gas source 506 is coupled in flow communication with second feed bin 106 to provide fluidizing gas flow 518, and carrier gas source 512 is coupled in flow communication with conveying line 110 to provide carrier gas flow 524. In the exemplary embodiment, carrier gas source 512 is coupled in flow communication with conveying line 110 via mixing device 176 that is coupled in flow communication with metering device 108. Alternatively, mixing device 176 is integral with metering device 108.

Each gas flow 522, 516, 518, and 524 is channeled through a respective line. More specifically, buffer gas flow 522 is channeled through a buffer gas line 534, second pressurizing gas flow 516 is channeled through a second pressurizing gas line 528, fluidizing gas flow 518 is channeled through a fluidizing gas line 530, and carrier gas flow 524 is channeled through a carrier gas line 536. Although lines 534, 528, 530, and 536 are shown as single lines in the figures, it should be understood that any of lines 534, 528, 530, and/or 536 can include parallel lines that can be used for rapid changes in pressure and/or throughput or for smaller adjustments during normal operation. Further, although buffer gas line 534 is coupled in flow communication downstream of pressurizing device 404 and upstream of valve 138 in the exemplary embodiment, buffer gas line 534 could alternatively be coupled in flow communication with metering device 108 (shown in FIG. 3).

A first feed valve 652 and a second feed valve 654 are coupled along a fuel feed line 656 in flow communication between a feed source 184 and first feed bin 102 to control a flow of feed stock 114. Supply valve system 428 is coupled in flow communication between gas sources 510, 504, 506, and 512 and bin 102 and/or 106 and/or device 404 and/or 108. As such, supply valve system 428 includes at least one valve for each gas source 510, 504, 506, and 512. More specifically, supply valve system 428 includes a buffer valve 548, a second pressurizing valve 542, a fluidizing valve 544, and a carrier valve 550. Buffer valve 548 is coupled along buffer gas line 534 in flow communication between buffer gas source 510 and downstream of pressurizing device 404 to control buffer gas flow 522. Second pressurizing valve 542 is coupled along pressurizing gas line 528 in flow communication between second pressurizing gas source 504 and second feed bin 106 to control second pressurizing gas flow 516. Fluidizing valve 544 is coupled along fluidizing gas line 530 in flow communication between fluidizing gas source 506 and second feed bin 106 to control fluidizing gas flow 518. Carrier valve 550 is coupled along carrier gas line 536 in flow communication between carrier gas source 512 and mixing device 176 to control carrier gas flow 524. Each valve 542, 544, 548, and 550 is communicatively coupled with control system 412, as described in more detail below.

In some embodiments, the buffer gas may be an inert gas, and the carrier gas, the pressurizing gas, and the fluidizing gas may be an inert gas or synthesis gas (syngas). Suitable inert gases include, but are not limited to, nitrogen and carbon dioxide. In the exemplary embodiment, inert gases are used to facilitate minimizing gas treating requirements of related vent streams. In an alternative embodiment, pressurizing gas source 504, fluidizing gas source 506, and carrier gas source 512 may be provided from a common gas source (not shown). The common gas source may then be coupled in flow communication with lines 528, 530, and 536. Further, a different common gas source may be used to supply second pressurizing gas through line 528, fluidizing gas through line 530, and carrier gas through line 536 during startup than during normal operation in feed system 400.

A bypass line 552 couples second feed bin 106 and carrier gas line 536 in flow communication. A bypass valve 554 is coupled along bypass line 552 to control a bypass gas flow 556 through bypass line 552. Bypass valve 554 is communicatively coupled with control system 412, as described in more detail below. In one embodiment, bypass line 552 is additionally or alternatively in fluid communication with conveying line 110 downstream from mixing device 176, or with line 182 at an inlet to or upstream from mixing device 176.

In some embodiments, a gas supply line 537 is used to supply carrier gas to second feed bin 106.

To remove gas from components of solids supply system 400, pressure control system 500 includes a plurality of vent or return lines. More specifically, a first feed bin return line 558 couples first feed bin 102 in flow communication with pressurizing device vent 483 included in return source 430, a pressurizing device return line 560 couples pressurizing device 404 in flow communication with pressurizing device vent 483 included in return source 430, a second feed bin return line 562 couples second feed bin 106 in flow communication with high pressure vent 485 included in return source 430, and a metering device return line 564 couples metering device 108 in flow communication with high pressure vent 487 included in return source 430. First feed bin return 558 is coupled in flow communication with pressurizing device return line 560 to channel gas to return source 430 via pressurizing device return line 560.

Return valve system 434 is coupled in flow communication along return lines 558, 560, 562, and 564 to control gas flows through each return line 558, 560, 562, and 564. Although lines 558, 560, 562, and 564 are shown as single lines in the figures, it should be understood that any of lines 558, 560, 562, and/or 564 can includes parallel lines that can be used for rapid changes in pressure and/or throughput or for smaller adjustments during normal operation.

More specifically, return valve system 434 includes a first feed bin return valve 568, a pressurizing device return valve 570, a second feed bin return valve 574, and a metering device return valve 576. First feed bin return valve 568 is coupled along first feed bin return line 558 to control a first feed bin gas flow 578. First pressurizing device return valve 570 is coupled along pressurizing device return line 560 to control a pressurizing device gas flow 582. In the exemplary embodiment, a pump 580, such as a vacuum blower, is coupled along pressurizing device return line 560 downstream from a point where first feed bin return line 558 is coupled in flow communication with pressurizing device return line 560. Second feed bin return valve 574 is coupled along second feed bin return line 562 to control a second feed bin gas flow 584. Metering device return valve 576 is coupled along metering device return line 564 to control a metering device gas flow 586. Each valve 568, 570, 574, and 576 is communicatively coupled to control system 412 for control thereof.

Control system 412 includes a plurality of sensors, transmitter, and/or controllers positioned throughout pressure control system 500. In the exemplary embodiment, control system 412 includes level transmitters 588 and 590, pressure transmitters 592 and 594, a temperature transmitter 596, flow transmitters 598, 600, 602, 658, 660, and 595, analyzer sensors 604, 608, and 610, pressure controllers 612, 614, and 662, speed controllers 616 and 664, flow controllers 620, 622, 626, and 628, differential pressure controllers 632, 634, 636, 640, and 666, a primary controller 644, and a secondary controller 646. Further, in the exemplary embodiment, control system 112 is configured to receive pressure data from a gasifier pressure sensor 17 and a recycle vent system pressure sensor 169.

Level transmitter 588 is coupled in communication with first feed bin 102 to measure a level within first feed bin 102. Level transmitter 590 is coupled in communication with second feed bin 106 to measure a level within second feed bin 106. Pressure transmitter 592 is coupled in communication with second feed bin 106 to measure a pressure within second feed bin 106. Pressure transmitter 594 is coupled in communication with conveying line 110 to measure a pressure within conveying line 110. Temperature transmitter 596 is coupled in communication with conveying line 110 to measure a temperature within conveying line 110. Flow transmitter 658 is coupled in communication with first feed bin return line 558 to measure a flow within first feed bin return line 558. Flow transmitter 602 is coupled in communication with bypass line 552 to measure a flow within bypass line 552. Flow transmitter 660 is coupled in communication with pressurizing device return line 560 to measure a flow within pressurizing device return line 560. Flow transmitter 598 is coupled in communication with second feed bin return line 562 to measure a flow within second feed bin return line 562. Flow transmitter 600 is coupled in communication with metering device return line 564 to measure a flow within metering device return line 564. Flow transmitter 595 is coupled in communication with conveying line 110 and/or with differential pressure controller 640, pressure transmitter 594, and temperature transmitter 596 to determine a flow within conveying line 110. In an alternative embodiment, the flow in conveying line 110 is measured by any method that enables solids feed system 500 to function as described herein.

Analyzer 604 is coupled in communication with first feed bin return line 558 to detect a presence of at least one predetermined chemical, CO or $H_2$, within first feed bin return line 558. Analyzer 608 is coupled in communication with pressurizing device return line 560 to detect a presence of at least one predetermined chemical, such as CO or $H_2$, within pressurizing device return line 560. Analyzer 610 is coupled in communication with metering device return line 564 to detect a presence of at least one predetermined substance, such as carbon monoxide or hydrogen, within metering device return line 564. If the predetermined chemical is detected by at least one of analyzers 604, 608, and/or 610, it can be determined whether a process gas backflow is occurring in solids supply system 400.

Pressure controller 612 is coupled in communication with first feed bin return line 558 and first feed bin return valve 568 to measure a pressure within first feed bin return line 558 and control first feed bin return valve 568 using the measured pressure. Pressure controller 662 is coupled in communication with pressurizing device 404 and pressurizing device return valve 570 to measure a pressure within pressurizing device 404 and control pressurizing device return valve 570 using the measured pressure. Speed controller 664 is coupled in communication with a motor 488 of pressurizing device 404 to control motor 488 based on a signal from secondary controller 646. Speed controller 616 is coupled in communication with motor 178 of metering device 108 to control motor 178 based on a demand signal 648.

Flow controller 626 is coupled in communication with buffer gas line 534 and buffer valve 548 to measure a flow within buffer gas line 534 and control buffer valve 548 using the measured flow. Flow controller 626 is further coupled in communication with flow transmitter 660 and differential pressure controller 666 to receive signals from flow transmitter 660 and differential pressure controller 666. Flow controller 620 is coupled in communication with second pressurizing gas line 528 and pressurizing valve 542 to measure a flow within second pressurizing gas line 528 and control pressurizing valve 542 using the measured flow. Flow controller 622 is coupled in communication with fluidizing gas line 530 and fluidizing valve 544 to measure a flow within fluidizing gas line 530 and control fluidizing valve 544 using the measured flow. Flow controller 628 is coupled in communication with carrier gas line 536 and carrier valve 550 to measure a flow within carrier gas line 536 and control carrier valve 550 using the measured flow. Flow controller 628 also is coupled in communication with flow transmitter 602 and pressure controller 614 to receive signals therefrom. Flow controller 628 also receives a demand signal 648 indicating the solids feed rate and an SLR signal 650 indicating the solids loading ratio of solids supply system 400. Flow controller 549 is coupled in flow communication with carrier gas line 537, and bypass line 552 and/or second bin 106 to measure a flow within gas supply line 537 and control valve 547 using the measured flow.

Differential pressure controller 666 is coupled in communication with pressurizing device 404 and second feed bin 106 to measure a differential pressure between pressurizing device 404 and second feed bin 106. Differential pressure controller 666 is also coupled in communication with flow controller 626 to send signals thereto. Differential pressure controller 632 is coupled in communication with bypass line 552 on each side of bypass valve 554 to measure a differential pressure along bypass line 552. Differential pressure controller 636 is coupled in communication with feed line 180 upstream of metering device 108 and feed line 182 downstream of metering device 108 to measure a differential pressure between feed line 180 and feed line 182. As such, differential pressure controller 636 measures a differential pressure across metering device 108 and/or between the outlet of the secondary feed bin 106 and the inlet of mixing device 176. Differential pressure controller 640 is coupled in communication with an upstream point on conveying line 110 and a downstream point on conveying line 110 to measure a differential pressure along conveying line 110.

Differential pressure controllers 632 and 636 are each coupled in communication with pressure controller 614 to transmit the differential pressures to pressure controller 614, and differential pressure controllers 632 and 666 are each coupled in communication with at least secondary controller 646 to transmit the differential pressures to secondary controller 646. Differential pressure controller 666 is further coupled in communication with flow controller 626 to control buffer valve 548 via flow controller 626. Differential pressure controller 640 is coupled in communication with primary controller 644 to transmit the differential pressure to primary controller 644.

Primary controller 644 is configured to calculate a net rate of change of solids within solids supply system 400. More specifically, primary controller 644 calculates a rate of change of solids contained within second feed bin 106 based on a rate of solids being discharged from pressurizing device 404 and a rate of solids channeled by metering device 108 into conveying line 110. In the exemplary embodiment, primary controller 644 receives signals from differential pressure controller 640, speed controller 616, speed controller 664, temperature transmitter 596, and pressure transmitter 594 and a density measurement of feed stock 114. Primary controller 644 outputs a signal to secondary controller 646. More specifically, primary controller 644 outputs a differential rate signal to secondary controller 646, which transmits a signal to pressure controller 614. Pressure controller 614 uses the differential rate signal to determine a net change in a gas volume within second feed bin 106. As such, pressure controller 614 can slow a rate of pressurization of second feed bin 106 when the net quantity of solids is increasing in second feed bin 106 and increase the rate of pressurization when the net quantity of solids in second feed bin 106 is decreasing.

Secondary controller 646 is configured to calculate flow rates and levels through solids supply system 400 to control a rate of change of pressure controller 614. More specifically, secondary controller 646 receives the differential volume of solids from primary controller 644 and other flows, levels, and/or pressures through solids supply system 400 to determine a rate of change for pressure controller 614. In the exemplary embodiment, secondary controller 646 receives signals from primary controller 644, level transmitter 590, flow transmitter 598, flow transmitter 600, flow transmitter 602, flow transmitter 660, flow controller 622, flow controller 626, flow controller 628, differential pressure controller 632, and differential pressure controller 666 and the density measurement. Secondary controller 646 outputs rate of change signals to speed controller 664 and pressure controller 614. As such, secondary controller 646 provides additional control by pressure controller 614, by taking into account net changes occurring in variables, such as a quantity of feed stock 114 and/or gas in bin 106, demand and other feed stock 114 or gas flows, that could impact the pressure within second feed bin 106, as well as the input from primary controller 644, such as a net gas flow back through or from pressurizing device 404.

Pressure controller 614 is configured to control a pressure within second feed bin 106 using at least two pressure measurements and/or differential pressure measurements. More specifically, pressure controller 614 receives signals from secondary controller 646, differential pressure controller 632, differential pressure controller 634, differential pressure controller 636, pressure transmitter 592, and flow transmitter 602 and a measurement of pressure within gasifier 16 from gasifier pressure sensor 17 and/or a measurement of pressure in recycle vent system 176 from vent system pressure sensor 169. A rate of the change in pressure within second feed bin 106 is determined by pressure controller 614 based on the signal from secondary controller 646. Pressure controller 614 may transmit signals to flow controller 620, flow controller 628, control valve 549, bypass valve 554, second feed bin return valve 574, and metering device return valve 576.

In some embodiments, the pressure in bin 106 may be increased or decreased with pressure controller 614. When increasing the pressure, pressure controller 614 facilitates channeling second pressurizing gas 504 via line 528 through valve 542 to bin 106. In such an embodiment, second feed bin 106 is pressurized by pressurizing gas flow 516. When decreasing the pressure, pressure controller 614 facilitates venting gas from bin 106 to first high pressure vent 485 via valve 574 and line 562. In embodiments where the pressure in bin 106 is lower than the carrier gas pressure, the bin pressure may be increased with differential pressure controller 632 and/or pressure controller 614 via line 552. Further, valve 550 may be relocated to a position in carrier gas line 110 downstream from the connection of line 552 at line 110 and upstream from mixing device 176 such that the off-take of carrier gas is enabled at a higher pressure. Moreover, second feed bin 106 may be pressurized from carrier gas source 512 via line 537. In embodiments where the pressure in bin 106 is higher than the carrier gas pressure, the pressure in bin 106 may be decreased with differential pressure controller 632 and/or pressure controller 614 via valve 554 and line 552. In embodiments where the pressure in bin 106 is to be maintained at substantially the same pressure as the carrier gas pressure in line 110 between valve 550 and mixing device 176, bypass valve 554 may be omitted from pressure control system 200 or replaced with an alternate flow restricting device such as a flow restriction orifice. In such embodiments, a differential pressure measurement from differential pressure controller 632 and/or a flow measurement from flow transmitter 602 are used by flow controller 628 to maintain a flow rate of carrier gas flow 524 being channeled into mixing device 176.

Pressures are properly identified and controlled within solids supply system 400 so that pressure fluctuations, and the accompanying gas and particle velocity fluctuations, are kept to a minimum. Such identification and control can be especially important during transitions, such as startup, and changes in throughput and SLR. In the exemplary embodiment, differential pressure controller set points and/or controls are adjusted to account for system properties and/or specifications, such as feeder speed, solids flow rates, solids levels, feed properties (i.e. type, moisture content, density, particle size distribution, permeability), gas leak rate, and/or any other suitable properties and/or specifications. The set points and/or controls are used to control a pressure within second feed bin 106 to, in turn, control a pressure within metering device 108. The desired pressure set points can be achieved by implementing two types of context-based controls.

The first type of control is embodied as pressure controller 614. Pressure controller 614 uses a combination of two or more pressure or differential pressure measurements, where the set point of at least pressure controller 614 is adjusted based upon a set point and/or actual value of at least one other pressure or differential pressure measurement, such as a measurement from differential pressure controller 632 and/or differential pressure controller 636. In the exemplary embodiment, pressure controller 614 provides an estimate of a required set point for a pressure of second feed bin 106 based on a downstream pressure adjusted by a transfer function that estimates a pressure drop between second feed bin 106 and the downstream pressure. For example, if the feed is being channeled gasifier 16, pressure controller 614 may use the pressure from pressure transmitter 17 as the downstream pressure, and if the feed is being channeled to recycle vent system 167, pressure controller 614 may use the pressure measurement from pressure transmitter 169 as the downstream pressure. The estimated set point is fine-tuned using a readily defined pressure drop set point across a component or increment of solids supply system 400, for example, a pressure drop across metering device 108 immediately downstream of second feed bin 106 is used to fine-tune the estimated set point. Other differential pressures that can additionally or alternatively be used to adjust the set point include, but are not limited to including, a differential pressure across second feed bin 106 and metering device 108, a differential pressure across a portion of conveying line 110, and/or a differential pressure across valve 554. The estimated set point is used to control the pressure within second feed bin 106. In an alternative embodiment, the pressure within second feed bin 106 may be controlled using an estimated set point for a differential pressure between second feed bin 106 and gasifier 16 and/or, when recycle vent system 167 is in use, between feed bin 106 and recycle vent system 167. The estimated set point is then fine-tuned using a static pressure at outlet 146 of metering device 108 based on the pressure in second feed bin 106 and a desired change in pressure across metering device 108.

The use of a combination of measurements of pressure or differential pressure from different transmitters and/or controllers is particularly beneficial because the potential problems of relying on one or the other alone as the control input are avoided. For example, using the gasifier pressure and transfer function alone will control the pressure of second feed bin 106 to be close to the actual required set point, but may lead to instabilities in the pressure distribution and flows in solids supply system 400 and the downstream processes due to the difference between the predicted and actual required set point. Further, by using the metering device differential pressure alone, even with moderate errors in the pressure of second feed bin 106, could lead to swings in pressures and flows as the differential pressure control attempts to achieve the correct differential pressure.

The second type of control is embodied by primary controller 644 and secondary controller 646. Such a control uses information regarding an effect of other controllers and equipment in solids supply system 400 to tune or adjust the manner in which a given controller or set of controllers operate. For example, using the rate at which pressurization gas flow 516 is added to second feed bin 106, which may contain variable quantities of solids, takes into account an actual void volume within second feed bin 106 that the gas will occupy and how the actual void volume is affected by any on-going changes in the rate of solids flow into and out of second feed bin 106.

To control pressures within solids supply system 400, pressure control system 500 bypass line 552 and bypass valve 554; flow controller 622 for controlling fluidizing gas flow 518 through fluidizing gas line 530 via fluidizing valve 544; SLR signal 650, demand signal 648 flow controller 628, flow transmitter 602 for controlling carrier gas flow 524 through carrier gas line 536 via carrier valve 550; and demand signal 648 and speed controller 616 for controlling metering device 108. More specifically, pressure controller 614 uses inputs from differential pressure controller 632 and/or differential pressure controller 636, flow transmitter 602, pressure transmitter 592, and the reactor pressure 17 for controlling flow controller 628 and bypass valve 554 to achieve a predetermined pressure within second feed bin 106. Alternatively, pressure control system 500 uses pressure controller 614 and flow controller 620 for controlling second pressurizing gas flow 516 through pressurizing gas line 528 via pressurizing valve 542 to achieve the predetermined pressure within second feed bin 106. In such an alternative embodiment, pressure controller 614 further controls second feed bin return valve 574 and metering device return valve 576 using signals from flow transmitter 598, flow transmitter 600, differential pressure controller 634, and differential pressure controller 636. In the exemplary embodiment and alternative embodiment, a pressure set point of an incremental part of solids supply system 400 or component, such as a differential pressure from second feed bin 106 to outlet 146 of metering device 108, is used to determine a set point for another pressure controller to minimize process variability/instability, as described above.

Flow path and controls for operation with bypass line 552 and bypass valve 554 are related to primary controller 644 and secondary controller 646. More specifically, the main flow path controls include buffer gas line 534, buffer valve 548, and flow controller 626; valve 138; bypass line 552 and bypass valve 554; fluidizing gas line 530, fluidizing valve 544, and flow controller 622; speed controller 616 and demand signal 648 to control motor 178; carrier gas line 536, carrier valve 550, SLR signal 650, and flow controller 628; first feed bin return line 558 and first feed bin return valve 568; speed controller 664 and motor 448; pressurizing device return line 560, pressurizing device return valve 570, pressure controller 662, flow transmitter 660, and pump 580; the density signal and signals from level transmitter 590, pressure transmitter 594, temperature transmitter 596, differential pressure controller 640, primary controller 644, secondary controller 646, and pressure controller 614. Flow paths and controls for operation without bypass line 552 and bypass valve 554 are related to secondary controller 646 and include pressurizing gas line 528, pressurizing valve 542, and flow controller 620; second feed bin return line 562 and second feed bin return valve 574; metering device return line 564 and metering device return valve 576; and signals from flow transmitter 598, flow transmitter 600, and differential pressure controller 636. The flow paths and controls use information about flows and inventories to improve an effectiveness of a basic pressure control concept. For example, using the above-mentioned sets of paths and controls, pressure controls system 500 determines how much gas inventory is in second feed bin 106 to determine how solids supply system 400 should respond to a falling or rising pressure.

When buffer gas is used in solids supply system 400, pressure control system 500 controls buffer gas flow 522, first feed bin gas flow 578, and pressurizing device gas flow 582 by controlling valves 548, 568, and 570. More specifically, speed controller 664 is used to control motor 488, pressure controller 612 is used to control first feed bin return valve 568, pressure controller 662 is used to control pressurizing device return valve 570, and flow controller 626 is used to control buffer valve 548 based on signals from flow transmitter 602, analyzer 604, analyzer 608, flow transmitter 660, and speed controller 664. Further, pump 580 is operated to facilitate venting of return gas flows 578 and 582 by drawing gas through first feed bin return line 558 and/or pressurizing device return line 560. In the exemplary embodiment, flow controller 626 controls buffer valve 548 to ensure that a pressure upstream of valve 138 is higher than a pressure within second feed bin 106 to facilitate preventing gas from flowing from second feed bin 106 into pressurizing device 404. Based on a flow measurement from flow transmitter 660, flow controller 626 can also ensure a positive flow from a body of pressurizing device 404 into pressurizing device return line 560. For example, flow controller 626 can have a pressure set point at a predetermined percentage, such as 10%, above the pressure measured by flow transmitter 660. Further, any suitable buffer gas systems similar to those used with pressurizing device 404 may be used with metering device 108 that enables solids supply system 400 to function as described herein.

Further, a pressure within first feed bin 102 is controlled to be higher than a pressure within the body of pressurizing device 404 to facilitate channeling gas through pressurizing device return line 560 rather than through first feed bin return line 558. More specifically, pressure controller 612 controls first feed bin return valve 574 to maintain the pressure within first feed bin 102 to be higher than the pressure within the body of pressurizing device 404. In the exemplary embodiment, pressure controller 662 and pressure controller 612 are configured to control a pressure balance across pressurizing device 404. More specifically, the pressure balance ensures that any gases venting from pressurizing device 404 occur through the body of pressurizing device 404 rather than through suction side 484 of pressurizing device 404, where solids that flow into pressurizing device 404 could be affected. Alternatively, similar functionality could be achieved by replacing pressure controller 662 and pressure controller 612 with a pressure control and a differential pressure control in which the differential pressure control controls a pressure across suction side 484 and body of pressurizing device 404 and the pressure control controls a feeder suction pressure of pressurizing device 404.

When bypass line 552 is present, pressure controller 614 uses at least two pressure and/or differential pressure measurements to control the pressure within second feed bin 106. More specifically, pressure controller 614 uses a pressure measurement from pressure transmitter 592 and a differential pressure measurement from differential pressure controller 632 to control bypass valve 554. Although measurements from pressure transmitter 592 and differential pressure controller 632 are described herein, it should be understood that other pressure and/or differential pressure measurements may be used by pressure controller 614 to control bypass valve 554. In the exemplary embodiment, pressure controller 614 uses the signal from secondary controller 646 to determine a rate of change of bypass valve 554 to control a rate of change of the pressure within second feed bin 106. Pressure controller 614 also sends a signal to flow controller 628 regarding a direction and/or an amount of flow through bypass valve 554 such that carrier gas flow 524 can be adjusted accordingly. Flow transmitter 602 additionally or alternatively transmits a flow measurement to flow controller 628 to control carrier gas flow 524.

When bypass line 552 is omitted, pressure controller 614 uses at least two pressure and/or differential pressure measurements to control the pressure within second feed bin 106. More specifically, pressure controller 614 uses a pressure measurement from pressure transmitter 592 and a differential pressure measurement from differential pressure controller 636 to control pressurizing valve 542. Although measurements from pressure transmitter 592 and differential pressure controller 636 are described herein, it should be understood that other pressure and/or differential pressure measurements may be used by pressure controller 614 to pressurizing valve 542. In the exemplary embodiment, pressure controller 614 uses the signal from secondary controller 646 to determine a rate of change of pressurizing valve 542 to control a rate of change of the pressure within second feed bin 106. Further, because gas is not vented from second feed bin 106 to carrier gas line 536 via bypass line 552 in this embodiment, pressure controller 614 also controls valves 574 and/or 576 to control the pressure within second feed bin 106.

In some alternative embodiments, solids supply system 400 may include a combined metering and pressurizing device instead of metering device 108. The combined device may be a dual-function device that at least partially pressurizes and meters feed stock 114. The combined device may be coupled between second feed bin 106 and conveying line 110, and more specifically, coupled downstream from second feed bin 106 and upstream from conveying line 110.

In another alternative embodiment, solids supply system 400 may include a second pressurizing device coupled downstream from second feed bin 106 and upstream from metering device 108. The second pressurizing device may be a single-function device that at least partially pressurizes feed stock 114. More specifically, the second pressurizing device may pressurize feed stock 114 from the second pressure to a third pressure that is greater than the second pressure. As such, in the alternative embodiment, solids supply system 400 pressurizes feed stock 114 more than once.

The above-described invention facilitates increasing the efficiency and robustness of pressurizing and metering feed stock (i.e., solids) and/or a fuel source within a solids supply system such that the feed stock is substantially uniformly channeled to a gasifier, such as a gasifier within an integrated gasification combined cycle system. Specifically, the solids supply system described herein enables at least one device to pressurize the feed stock to a high pressure and a separate device to meter the solids at the high pressure to the gasifier. Moreover, the device that meters the solids has a low pressure differential between the inlet and the outlet, such that the solids may be metered over a large span of feed rates under substantially steady conditions.

A technical effect of the systems and methods described herein includes at least one of: (a) obtaining a first pressure measurement using a first pressure sensing device within the solids supply system, the first pressure measurement including at least one of a first differential pressure and a first pressure within the solids supply system; (b) obtaining a second pressure measurement using a second pressure sensing device within the solids supply system, the second pressure measurement including at least one of a second differential pressure and a second pressure within the solids supply system; (c) controlling a pressure within a high pressure feed bin of the solids supply system based on the first pressure measurement and the second pressure measurement using a pressure controller; (d) calculating a change in at least one of a rate of solids and a volume of solids within said solids supply system using a primary controller; (e) calculating flow rates and levels throughout the solids supply system using a secondary controller coupled in communication with the pressure controller and the primary controller; and (f) controlling a rate of pressure change within the high pressure feed bin based on the calculations of the primary controller and the secondary controller.

Exemplary embodiments of a pressure control system are described above in detail. The system is not limited to the specific embodiments described herein, but rather, components of each system may be utilized independently and separately from other components described herein. Each system described herein may also be used in combination with other systems, and is not limited to practice with only the gasification system described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pressure control system comprising:
   a first pressure sensing device configured to obtain a first pressure measurement including at least one of a first differential pressure or a first pressure, the first pressure measurement obtained at a first component of a solids supply system, the first component positioned at least one of upstream and downstream from a second component of the solids supply system;
   a second pressure sensing device configured to obtain a second pressure measurement including at least one of a second differential pressure or a second pressure within the second component of the solids supply system; and
   a pressure controller configured to use the first pressure measurement and the second pressure measurement to determine a set point for said pressure controller and at least one of the first component and the second component, wherein the set point is adjusted based on a pressure difference defined by a difference between at least one of the first pressure measurement and the second pressure measurement and a desired pressure for the at least one of the first pressure measurement and the second pressure measurement, the set point adjusted to control a pressure within at least one of the first component and the second component of the solids supply system.

2. A pressure control system in accordance with claim 1 further comprising a secondary controller coupled in communication with said pressure controller, said secondary controller configured to calculate at least one of a flow rate and a quantity of solids within the solids supply system to control a rate of pressure change within a high pressure feed bin of the solids supply system.

3. A pressure control system in accordance with claim 2 further comprising a primary controller coupled in communication with said secondary controller, said primary controller configured to calculate a change in at least one of a flow rate, a pressure, and a quantity of solids within the solids supply system.

4. A pressure control system in accordance with claim 1, wherein said first pressure sensing device comprises a pressure transmitter coupled in communication with at least one of a solids flow path of the solids supply system, a recycle system, and a receiving system, said pressure transmitter configured to measure a pressure within at least one of the solids flow path, the recycle system, and the receiving system as the first pressure measurement.

5. A pressure control system in accordance with claim 1, wherein said second pressure sensing device comprises a second differential pressure controller coupled in communication along a first feed line at least one of upstream from and at an inlet of a metering device of the solids supply system and along a second feed line at least one of downstream from and at an outlet of the metering device, said second differential pressure controller configured to measure a differential pressure across the metering device as the second pressure measurement.

6. A pressure control system in accordance with claim 5 further comprising a pressurizing valve along a pressurizing gas line in flow communication with the high pressure feed bin, said pressurizing valve in communication with at least one of said pressure controller or a first flow controller in communication with said pressure controller configured to control the pressure within the high pressure feed bin using a pressurizing gas flow in the pressurizing gas line based on the first pressure measurement and the second pressure measurement.

7. A pressure control system in accordance with claim 1 further comprising a second flow controller coupled in communication with said pressure controller and a buffer valve along a buffer gas line in flow communication upstream from the high pressure feed bin, said second flow controller configured to control a buffer gas flow through the buffer gas line to facilitate preventing process gas backflow into a pressurizing device upstream from the high pressure feed bin.

8. A pressure control system in accordance with claim 1 further comprising a third flow controller coupled in communication with said pressure controller and a buffer valve along a buffer gas line in flow communication downstream from a metering device of the solids supply system, said third flow controller configured to control a buffer gas flow through the buffer gas line to facilitate preventing process gas backflow into metering device.

* * * * *